US008424056B2

(12) United States Patent
Naganuma

(10) Patent No.: US 8,424,056 B2
(45) Date of Patent: Apr. 16, 2013

(54) WORKFLOW SYSTEM AND OBJECT GENERATING APPARATUS

(75) Inventor: Tadashi Naganuma, Machida (JP)

(73) Assignee: Canon Kabushiki Kaisha (JP)

( * ) Notice: Subject to any disclaimer, the term of this patent is extended or adjusted under 35 U.S.C. 154(b) by 1459 days.

(21) Appl. No.: 11/550,030

(22) Filed: Oct. 17, 2006

(65) Prior Publication Data

US 2007/0100765 A1 May 3, 2007

(30) Foreign Application Priority Data

Oct. 17, 2005 (JP) ................................. 2005-302164

(51) Int. Cl.
*G06F 7/04* (2006.01)
(52) U.S. Cl.
USPC ............... 726/2; 705/59; 705/7.26; 705/7.17; 705/7.23; 713/182
(58) Field of Classification Search .................. 726/2–3; 705/1, 9
See application file for complete search history.

(56) References Cited

U.S. PATENT DOCUMENTS

| | | | | |
|---|---|---|---|---|
| 6,578,006 B1 * | 6/2003 | Saito et al. | ........ | 705/7.26 |
| 6,615,230 B2 * | 9/2003 | Nishimura | ........ | 718/101 |
| 7,152,208 B2 * | 12/2006 | Ohashi | ........ | 715/229 |
| 7,353,402 B2 * | 4/2008 | Bourne et al. | ........ | 713/193 |
| 7,434,048 B1 * | 10/2008 | Shapiro et al. | ........ | 713/165 |
| 2002/0169876 A1 * | 11/2002 | Curie et al. | ........ | 709/226 |
| 2006/0190989 A1 * | 8/2006 | Furuya | ........ | 726/2 |
| 2006/0230282 A1 * | 10/2006 | Hausler | ........ | 713/182 |
| 2007/0033637 A1 * | 2/2007 | Yami et al. | ........ | 726/2 |

FOREIGN PATENT DOCUMENTS

| | | |
|---|---|---|
| JP | 07-319820 A | 12/1995 |
| JP | 2005-004549 A | 1/2005 |

OTHER PUBLICATIONS

Windows® 2000 Server Professional Reference by Karanjit S. Siyan Ph.D. Publisher: Sams Pub Date: Jul. 10, 2000 Print ISBN-10: 0-7357-0952-1 Print ISBN-13: 978-0-7357-0952-2 pp. 1848.*
"The Specification and Enforcement of Authorization Constraints in Workflow Management Systems";Bertino et al; ACM Transactions on Information and System Security, vol. 2, No. 1, Feb. 1999.*
Sarin et al. A Process Model and System for Supporting Collaborative Work. Conference proceedings on Organizational computing systems, 1991. ACM Doc.*
Alessandra Agostini & Giorgio De Michelis;A Light Workflow Management System Using Simple Process Models; Computer Supported Cooperative Work 9: 335-363, 2000. © 2000 Kluwer Academic Publishers. Printed in the Netherlands.*

* cited by examiner

*Primary Examiner* — Taghi Arani
*Assistant Examiner* — Jason Lee
(74) *Attorney, Agent, or Firm* — Rossi, Kimms & McDowell LLP

(57) ABSTRACT

A workflow system which restricts improper operations on an object circulated in a workflow by dynamically modifying access rights for the object according to the working status of the workflow. For example, the workflow system is a system which processes an object according to a workflow having a plurality of working statuses. When the working status for the object is changed, a modifying unit modifies access rights applied to the object. A control unit then controls operations on the object based on the modified access rights.

9 Claims, 24 Drawing Sheets

FIG. 8

| | | |
|---|---|---|
| 801 | USER ID | IWDM-AAAA |
| | PASSWORD | ***** |
| | USER NAME | Naganuma |
| | DIVISION INFORMATION | DS52 |
| | DIVISION ID | IWDM-00055 |
| | SUB-CHIEF ID | IWDM-BBBB |
| | CHIEF ID | IWDM-CCCC |
| | TREASURER ID | IWDM-DDDD |
| | AUTHENTICATION SERVER | DMS01 |
| | | |
| | | |
| 802 | USER ID | IWDM-BBBB |
| | PASSWORD | ***** |
| | USER NAME | Sugiyama |
| | DIVISION INFORMATION | DS52 |
| | DIVISION ID | IWDM-00055 |
| | SUB-CHIEF ID | IWDM-BBBB |
| | CHIEF ID | IWDM-CCCC |
| | TREASURER ID | IWDM-DDDD |
| | AUTHENTICATION SERVER | DMS01 |
| | | |

FIG. 9

| USER CONDITION | GENERATING DOCUMENT | (1) WAITING FOR APPROVAL | (2) WAITING FOR APPROVAL | (3) WAITING FOR APPROVAL | (4) COMPLETED |
|---|---|---|---|---|---|
| GENERATOR | DELETION ALLOWED | REFERENCE | REFERENCE | REFERENCE | REFERENCE |
| (1) "DIVISION SUB-CHIEF" | REFERENCE | APPROVAL ALLOWED | REFERENCE | REFERENCE | REFERENCE |
| (2) "DIVISION CHIEF" | REFERENCE | REFERENCE | APPROVAL ALLOWED | REFERENCE | REFERENCE |
| (3) "TREASURER" | REFERENCE | REFERENCE | REFERENCE | APPROVAL ALLOWED | REFERENCE |
| (4) OTHERS | N/A | N/A | N/A | N/A | N/A |

FIG. 10

GENERATING DOCUMENT

| POLICY 00 | |
|---|---|
| USER CONDITION | ACCESS RIGHT |
| GENERATOR | DELETION ALLOWED |
| (1) "DIVISION SUB-CHIEF" | REFERENCE |
| (2) "DIVISION CHIEF" | REFERENCE |
| (3) "TREASURER" | REFERENCE |
| (4) OTHERS | N/A |

(1) WAITING FOR SUB-CHIEF'S APPROVAL

| 1001~POLICY 01 | 1002 |
|---|---|
| USER CONDITION | ACCESS RIGHT |
| GENERATOR | REFERENCE |
| (1) "DIVISION SUB-CHIEF" | APPROVAL ALLOWED |
| (2) "DIVISION CHIEF" | REFERENCE |
| (3) "TREASURER" | REFERENCE |
| (4) OTHERS | N/A |

1000
1003

(2) WAITING FOR CHIEF'S APPROVAL

| POLICY 02 | |
|---|---|
| USER CONDITION | ACCESS RIGHT |
| GENERATOR | REFERENCE |
| (1) "DIVISION SUB-CHIEF" | REFERENCE |
| (2) "DIVISION CHIEF" | APPROVAL ALLOWED |
| (3) "TREASURER" | REFERENCE |
| (4) OTHERS | N/A |

(3) WAITING FOR TREASURER'S APPROVAL

| POLICY 03 | |
|---|---|
| USER CONDITION | ACCESS RIGHT |
| GENERATOR | REFERENCE |
| (1) "DIVISION SUB-CHIEF" | REFERENCE |
| (2) "DIVISION CHIEF" | REFERENCE |
| (3) "TREASURER" | APPROVAL ALLOWED |
| (4) OTHERS | N/A |

(4) COMPLETED

| POLICY 04 | |
|---|---|
| USER CONDITION | ACCESS RIGHT |
| GENERATOR | REFERENCE |
| (1) "DIVISION SUB-CHIEF" | REFERENCE |
| (2) "DIVISION CHIEF" | REFERENCE |
| (3) "TREASURER" | REFERENCE |
| (4) OTHERS | N/A |

| USER CONDITION | GENERATING DOCUMENT | (1) WAITING FOR SUB-CHIEF'S APPROVAL | (2) WAITING FOR CHIEF'S APPROVAL | (3) WAITING FOR TREASURER'S APPROVAL | (4) COMPLETED |
|---|---|---|---|---|---|
| GENERATOR | POLICY 00 | POLICY 01 | POLICY 02 | POLICY 03 | POLICY 04 |
| (1) "DIVISION SUB-CHIEF" | | | | | |
| (2) "DIVISION CHIEF" | | | | | |
| (3) "TREASURER" | | | | | |
| (4) OTHERS | | | | | |

1201

F I G. 13
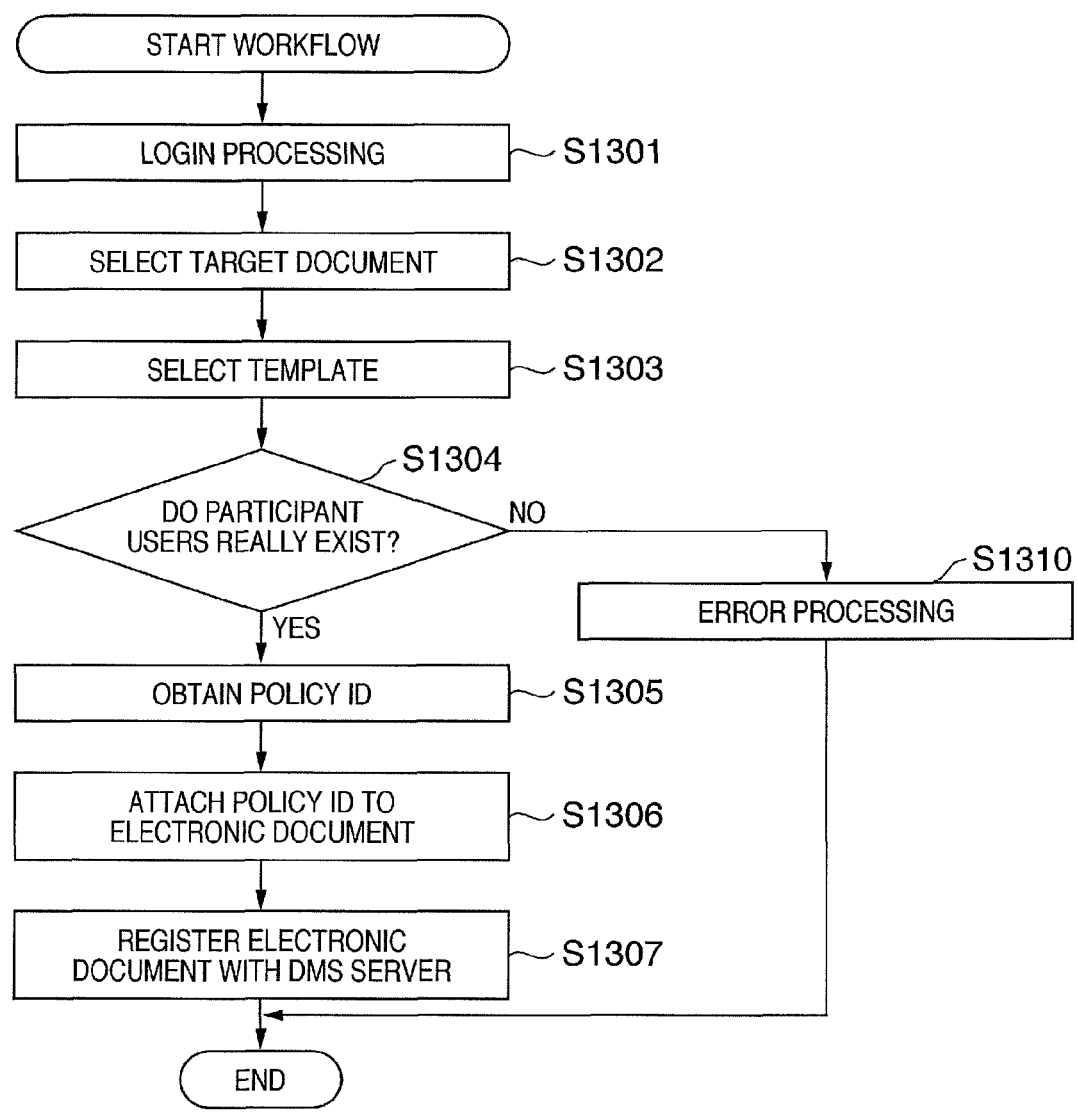

FIG. 20

| | 2001 | 2002 | 2003 | |
|---|---|---|---|---|
| | USER TYPE | IN-COMPANY | USER TYPE | EXTERNAL DEALER |
| 801 { | USER ID | IWDM-AAAA | USER ID | Mary |
| | PASSWORD | ***** | PASSWORD | ***** |
| | USER NAME | Naganuma | USER NAME | Mary |
| | DIVISION INFORMATION | DS52 | DIVISION INFORMATION | CSS SYSTEM |
| | DIVISION ID | IWDM-00055 | DIVISION ID | CSS-00050 |
| | SUB-CHIEF ID | IWDM-BBBB | SUB-CHIEF ID | CSS-0002 |
| | CHIEF ID | IWDM-CCCC | CHIEF ID | CSS0003 |
| | TREASURER ID | IWDM-DDDD | | |
| | AUTHENTICATION SERVER | DMS01 | | |
| | | | | |
| | | | | |
| 802 { | USER ID | IWDM-BBBB | USER ID | Tom |
| | PASSWORD | ***** | PASSWORD | ***** |
| | USER NAME | Sugiyama | USER NAME | Tom |
| | DIVISION INFORMATION | DS52 | DIVISION INFORMATION | CSS SYSTEM |
| | DIVISION ID | IWDM-00055 | DIVISION ID | CSS-00050 |
| | SUB-CHIEF ID | IWDM-BBBB | SUB-CHIEF ID | CSS-0002 |
| | CHIEF ID | IWDM-CCCC | CHIEF ID | CSS-0003 |
| | TREASURER ID | IWDM-DDDD | | |
| | AUTHENTICATION SERVER | DMS01 | | |
| | | | | |

Bracket labels on the right: 2004 (top group), 2005 (bottom group).

FIG. 21

POLICY 00 (GENERATING DOCUMENT)

| POLICY 00 | |
|---|---|
| USER CONDITION | ACCESS RIGHT |
| GENERATOR | DELETION ALLOWED |
| (1) "DIVISION SUB-CHIEF" | REFERENCE |
| (2) MARY | NOT ALLOWED |
| (3) TOM | NOT ALLOWED |
| (4) OTHERS | NOT ALLOWED |

POLICY 01 ((1) WAITING FOR APPROVAL)

| POLICY 01 | |
|---|---|
| USER CONDITION | ACCESS RIGHT |
| GENERATOR | REFERENCE |
| (1) "DIVISION SUB-CHIEF" | APPROVAL ALLOWED |
| (2) MARY | REFERENCE |
| (3) TOM | REFERENCE |
| (4) OTHERS | NOT ALLOWED |

POLICY 02 ((2) WAITING FOR APPROVAL)

| POLICY 02 | |
|---|---|
| USER CONDITION | ACCESS RIGHT |
| GENERATOR | DELETION ALLOWED |
| (1) "DIVISION SUB-CHIEF" | REFERENCE |
| (2) MARY | APPROVAL ALLOWED |
| (3) TOM | REFERENCE |
| (4) OTHERS | NOT ALLOWED |

2110

POLICY 03 ((3) WAITING FOR APPROVAL)

| POLICY 03 | |
|---|---|
| USER CONDITION | ACCESS RIGHT |
| "GENERATOR" | REFERENCE |
| (1) "DIVISION SUB-CHIEF" | REFERENCE |
| (2) MARY | REFERENCE |
| (3) TOM | APPROVAL ALLOWED |
| (4) OTHERS | NOT ALLOWED |

POLICY 04 ((4) COMPLETED)

| POLICY 04 | |
|---|---|
| USER CONDITION | ACCESS RIGHT |
| "GENERATOR" | REFERENCE |
| (1) "DIVISION SUB-CHIEF" | REFERENCE |
| (2) MARY | REFERENCE |
| (3) TOM | REFERENCE |
| (4) OTHERS | NOT ALLOWED |

| USER CONDITION | POINTER TO AUTHENTICATION INFORMATION | GENERATING DOCUMENT | (1) WAITING FOR APPROVAL | (2) WAITING FOR APPROVAL | (3) WAITING FOR APPROVAL | (4) COMPLETED |
|---|---|---|---|---|---|---|
| "GENERATOR" | | POLICY 00 | POLICY 01 | POLICY 02 | POLICY 03 | POLICY 04 |
| (1) "DIVISION SUB-CHIEF" | | POLICY 00 | POLICY 01 | POLICY 02 | POLICY 03 | POLICY 04 |
| (2) MARY | ***** | NOT ALLOWED | NOT ALLOWED | APPROVAL ALLOWED | REFERENCE | REFERENCE |
| (3) TOM | ***** | NOT ALLOWED | NOT ALLOWED | REFERENCE | APPROVAL ALLOWED | REFERENCE |
| (4) OTHERS | | POLICY 00 | POLICY 01 | POLICY 02 | POLICY 03 | POLICY 04 | though an object containing an access right is exemplified in some parts of this specification, the invention is obviously applicable to an object not containing an access right. When a single function of the invention is described with a plurality of functions, any one of the plurality of functions may be used to implement the invention. In addition, when a single function of the invention is described with a plurality of functions, any combination of the plurality of functions may be used to implement the invention. Further, the present invention is not limited to the embodiments described below, but various modifications and changes can be made therein without departing from the spirit and scope of the present invention.

WORKFLOW SYSTEM AND OBJECT GENERATING APPARATUS

BACKGROUND OF THE INVENTION

1. Field of the Invention

The present invention relates to a technique of executing a computerized workflow.

2. Description of the Related Art

Conventionally, documents in companies, such as purchase orders for materials and approval documents, have been circulated as paper media among workers to put approval stamps thereon. A series of operations on such a document is generally called a workflow. Recently, transition from paper documents to electronic documents is in process. Therefore, computerized workflows have also been demanded.

Companies in general may have a document management system introduced thereto for managing objects such as electronic documents and image files. The document management system can be applied to a system provided for realizing computerized workflows.

When an electronic document is shared among a plurality of users, the electronic document may be assigned different access rights (e.g., execution rights for reference, edition, printing, etc.) for different users. When the electronic document is maintained in the document management system, the document management system can appropriately manage the access rights for the electronic document. However, once the electronic document is brought out of the document management system, the document management system can no longer control the access rights.

According to Japanese Patent Application Laid-Open No. 2005-4549, a policy server that manages the access rights is introduced to manage the access rights for electronic documents brought out of the document management system.

Typically, the generator of an electronic document is granted all access rights including the rights to delete and edit. For example, a worker who generated a purchase order (the generator) can edit this electronic document even after the generator's boss performs approval processing for the electronic document. This would be a tampering with the electronic document and impair the validity of the approval stamp.

Accordingly, there is a need to appropriately modify the access rights for an electronic document according to a plurality of working statuses constituting a workflow.

An object of the present invention is to solve at least one of the above and other problems. The other problems will become apparent from the entirety of this specification.

SUMMARY OF THE INVENTION

The present invention is particularly preferably applied in, for example, a workflow system that processes an object according to a workflow having a plurality of working statuses. When the working status for the object is changed, a modifying unit modifies information concerning an access rights applied to the object contained in the object. A control unit then controls operations on the object based on the modified access rights.

The present invention dynamically modifies access rights for an object according to the working status of a workflow, so that improper operations on the object can be restricted.

Further features of the present invention will become apparent from the following description of exemplary embodiments with reference to the attached drawings.

BRIEF DESCRIPTION OF THE DRAWINGS

FIG. 8 is a diagram showing an example of user authentication data 474 according to the embodiment;

FIG. 9 is a diagram showing an example of template data according to the embodiment;

FIG. 10 is a diagram showing an example of access right definition information according to the embodiment;

FIG. 12 is a diagram showing an example of a policy reference table according to the embodiment;

FIG. 13 is an exemplary flowchart showing processing in the DMS client according to the embodiment;

FIG. 20 is a diagram showing another example of the user authentication data according to the embodiment;

FIG. 21 is a diagram showing an example of the definition information generated for each working status according to the embodiment;

FIG. 22 is a diagram showing an example of the policy reference table according to the embodiment;

DESCRIPTION OF THE EMBODIMENTS

Embodiments of the present invention will be described below. Of course, each embodiment described below will help understanding of various concepts of the present invention including the upper, middle, and lower concepts. The technical scope of the present invention is defined by the claims and not limited by any of the embodiments below.

First Embodiment

Figure 1:
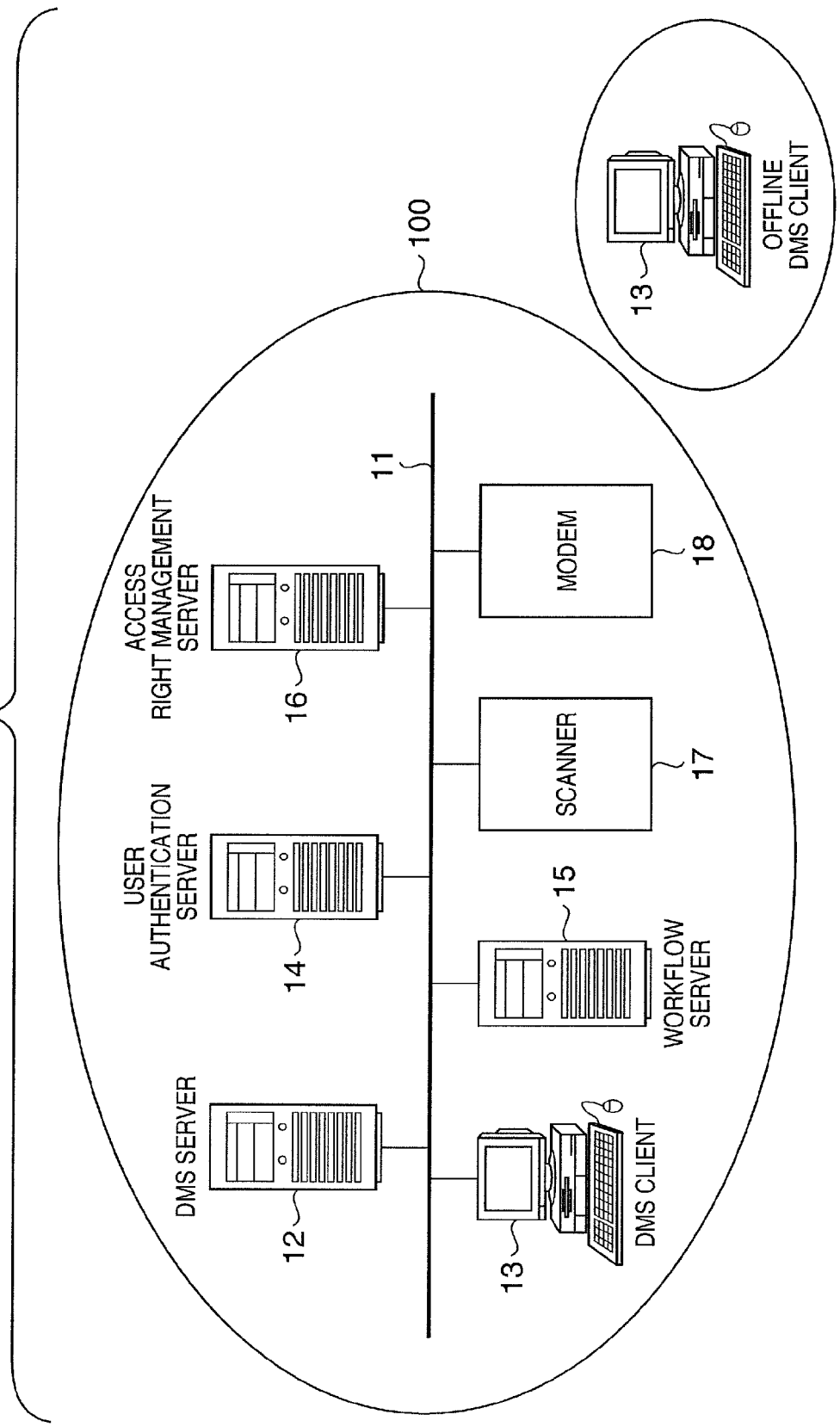
FIG. 1 is a diagram showing the schematic configuration of a document management system according to an embodiment.

FIG. 1 is a diagram showing the schematic configuration of a workflow system according to an embodiment. The workflow system is implemented by using, for example, a document management system (hereafter referred to as a DMS) 100. The DMS system 100 includes, for example, a DMS server 12, a DMS client 13, a user authentication server 14, a workflow server 15, an access right management server 16, a scanner 17, and a modem 18. These information processing devices are connected with each other via a network 11.

The OMS server 12 is a computer for managing objects handled by this DMS system 100. Objects means various types of information handled on computers, such as electronic documents and image files. Exemplary operations performed by the DMS server 12 include construction of an electronic document database, processing for transmission and reception of electronic documents between the devices, access control for electronic documents, and exclusive control of operations on the same electronic document.

The DMS client 13 is a PC (personal computer) for a user to perform actual operations such as inputting, referring to, and outputting electronic documents. While FIG. 1 shows only one DMS client 13 as being included in the DMS system 100 for convenience, a plurality of DMS clients 13 are typically connected to the network 11.

Also shown is a DMS client 13 not completely connected to the DMS system 100, that is, an offline DMS client 13. This DMS client 13 may be a PC connected to another network ox may be a standalone PC. The term offline as used herein means the state where an operator's DMS client 13 cannot connect to the DMS server 12 in executing a workflow.

The user authentication server 14 is a computer that performs user authentication processing required for the DMS client 13 to connect to the DMS server 12. Alternatively, the DMS server 12 may perform user management and authentication.

The workflow server 15 is a computer that performs processing for allowing a plurality of users to execute a workflow by sharing an electronic document stored in the DMS server 12. For example, the workflow server 15 makes various settings for the workflow and monitors the working status for the electronic document.

The access right management server 16 is a computer that stores and manages information such as access right definition information for each object. For example, the definition information includes information indicating whether or not various operations (e.g., reference, edition, and approval) on the object are permitted. The access right management server 16 may be able to manage the access rights for not only electronic documents maintained in the DMS server 12 but also electronic documents brought out of the DMS server 12. Therefore, the access right management server 16 is accessible by external PCs. The access right management server 16 may also be called a policy server.

The scanner 17 is a device that reads characters, graphics, and images printed or depicted on paper and converts them into image data for output. The scanner 17 may be implemented as a facsimile machine or a multifunction device. The DMS client 13 can control the scanner 17 to obtain image data. For example, the DMS client 13 may convert the image data into an electronic document (e.g., a PDF (Portable Document Format) file) and store it in the DMS server 12. Alternatively, the scanner 17 may convert the image data into an electronic document and directly store it in the DMS server 12.

The modem 18 is a communication device for communicating with other network systems. The modem 18 may be a router or a gateway. The devices in the network 11 transmit or receive e-mails and faxes via the modem 18. For example, a DMS client 13 connected to another network may connect to the servers in the network 11 via the modem 18. This will allow an operator to participate in the workflow even when the operator is outside the office.

Figure 2:
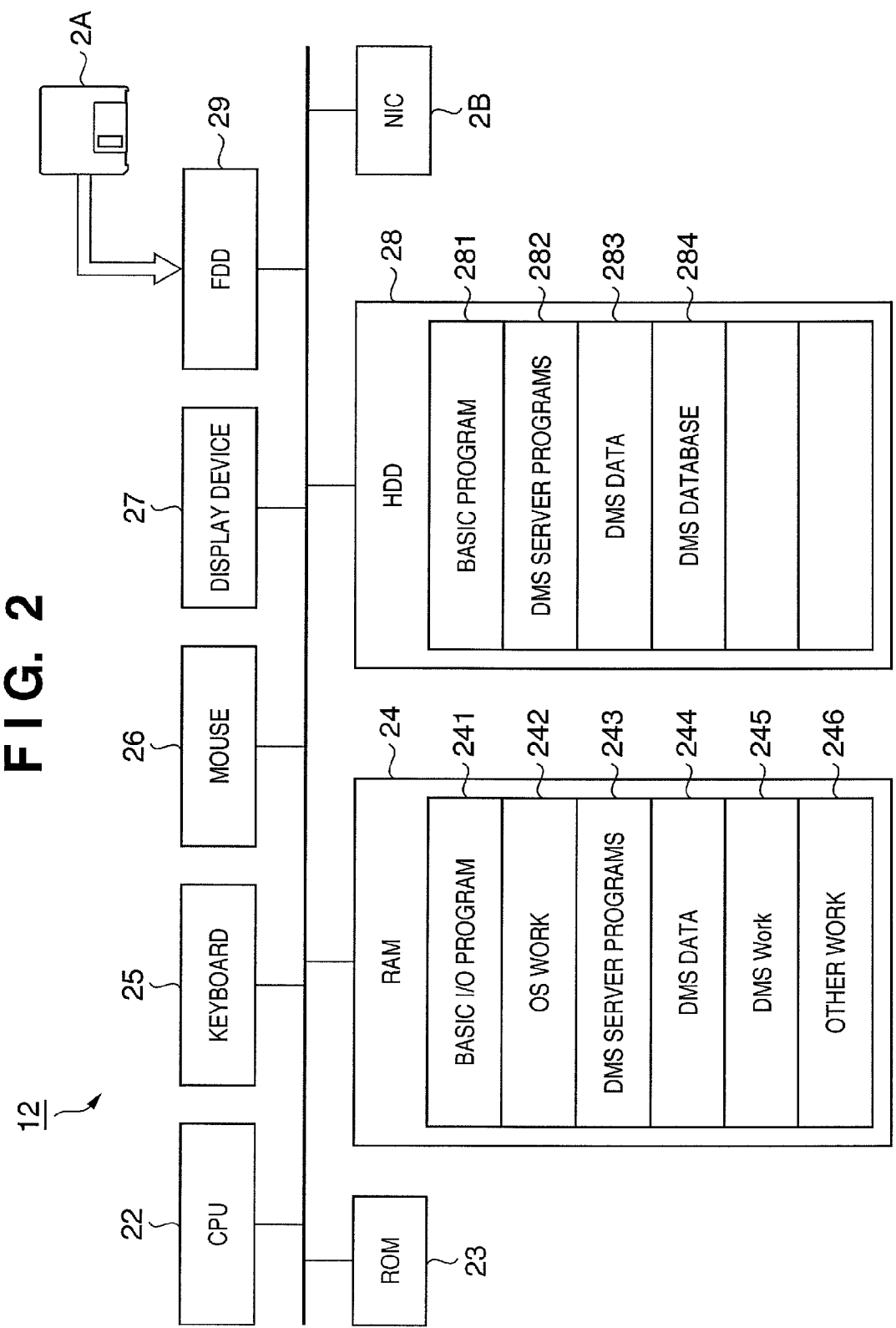
FIG. 2 is a block diagram describing the configuration of a DMS server 12 according to the embodiment in further detail.

FIG. 2 is a block diagram describing the configuration of the DMS server 12 according to this embodiment in further detail. A CPU (Central Processing Unit) 22 performs various kinds of processing according to control programs stored mainly in a hard disk drive (HDD) 28. Thus, the CPU 22 is the subject that performs processing described below.

ROM (Read Only Memory) 23 is a storage unit that stores basic programs such as firmware, as well as character fonts and preset data. RAM (Random Access Memory) 24 is a storage unit that has work areas required in performing the processing.

A storage area 241 has a basic I/O program loaded thereto. A storage area 242 is a work area for an operating system (OS) to operate. A storage area 243 is an area into which DMS server programs 282 are loaded. A storage area 244 is an area into which data such as DMS data 283 required for the DMS server programs 282 to operate is loaded. A storage area 245 is a work area for the DMS server programs to operate. For example, this work area is used to edit data, such as data in a database. A storage area 246 is a work area used in other processing.

A keyboard 25 and a pointing device (e.g., a mouse) 26 are each a kind of input device. A display device 27 is a device for displaying a processing result and so on.

The hard disk drive 28 is a mass storage unit. Stored in the hard disk drive 28 are a basic program 281 such as an operating system, the DMS server programs 282, the DMS data 283, DMS databases 284, and so on.

The DMS server programs 282 are, for example, programs for registering and managing users who connect to the DMS server 12. Exemplary DMS server programs 282 include programs for registering electronic documents with the DMS databases 284 and for retrieving registered electronic documents. The DMS data 283 is fixed data, for example resources required for the DMS server programs 282 to operate. The DMS databases 284 include a list of databases managed by the DMS server 12, the entities of the databases, and the entities of the electronic documents.

A flexible disk drive (FEDD) 29 is a storage unit used for purposes such as storing electronic documents in a flexible disk (FD) 2A. Data such as the DMS server programs 282 and the DMS data 283 is installed into the respective areas through the FD 2A. The FDD 29 may be other disk drives such as a CD-ROM drive and a DVD drive.

A network interface card (NIC) 2B is a communication unit for communicating with other servers and PCs. For example, the NIC 2B may be a LAN card.

Figure 3:
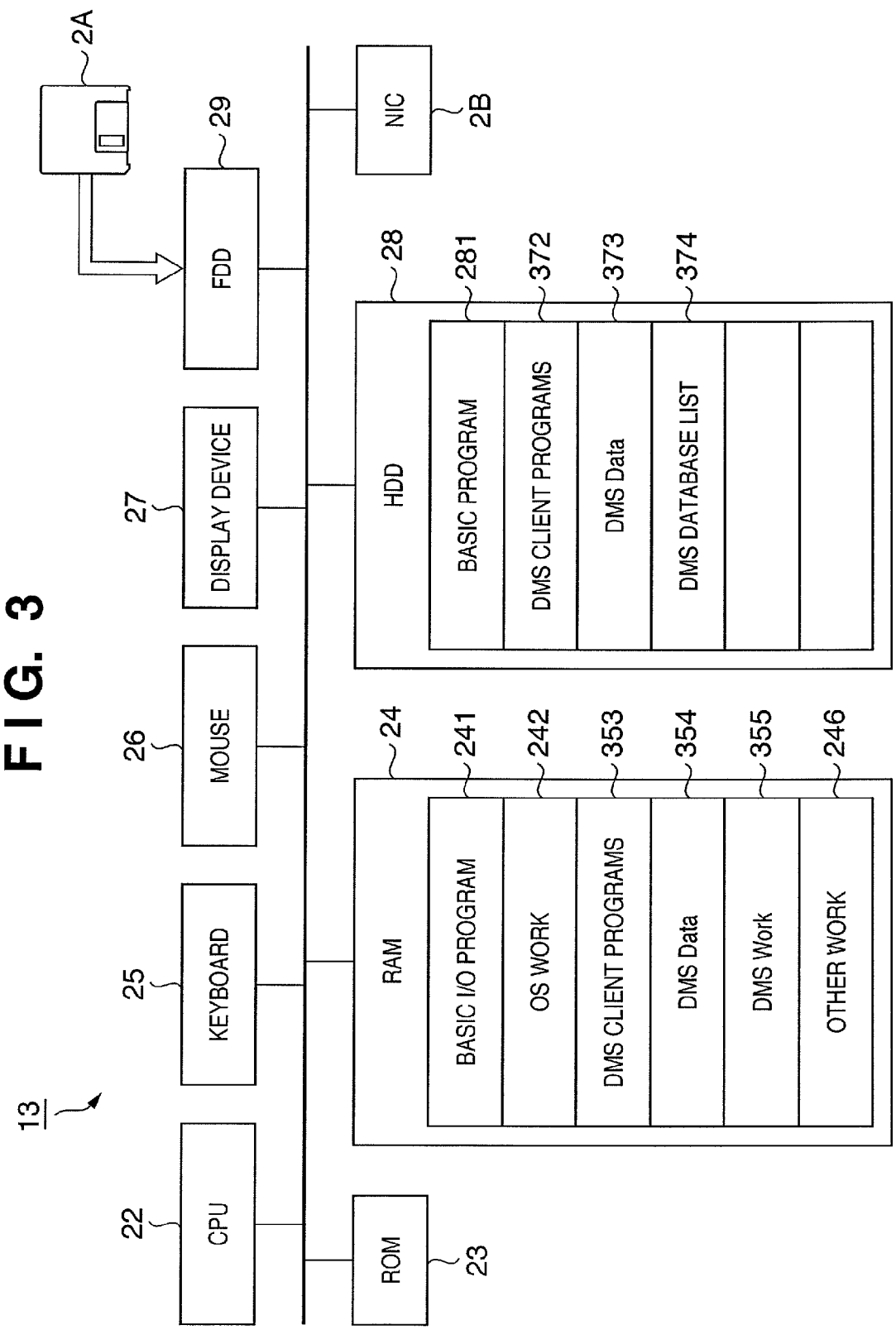
FIG. 3 is a block diagram describing the configuration of a DMS client 13 according to the embodiment in further detail.

FIG. 3 is a block diagram describing the configuration of the DMS client 13 according to this embodiment in further detail. The hardware configuration of the DMS client 13 and the DMS server 12 may be similar to or different from each other. For convenience of description, it is assumed here that a similar hardware configuration is adopted. The parts already described are given like reference numerals to simplify the description.

The RAM 24 has the following areas. A storage area 353 is an area into which DMS client programs 372 are loaded. A storage area 354 is an area into which data such as data required for the DMS client programs 372 to operate is loaded. A storage area 355 is a work area for the DMS client programs 372 to operate.

Exemplary DMS client programs 372 may include a program for communicating data with the DMS server 12, and a program for registering, retrieving, displaying, or editing electronic documents in cooperation with the DMS server 12. The DMS client programs 372 may further include a program for performing approval and rejection for executing a workflow, and a program for generating a PDF file from a certain electronic document. A program for registering a policy with the access right management server 16, and a program for generating a policy reference table and attaching the table to the PDF file may also be included. Of course, a program for providing a user interface for performing these operations may also be included.

DMS data 373 is fixed data, such as resources required for the DMS client programs 372 to operate. For example, this fixed data include initial setting values for the DMS client 13 to operate. A DMS database list 374 is a list of databases registered for reference by the DMS client 13. Besides databases managed by the DMS server 12, databases managed by DMS servers in other networks may be registered with this list.

Figure 4:
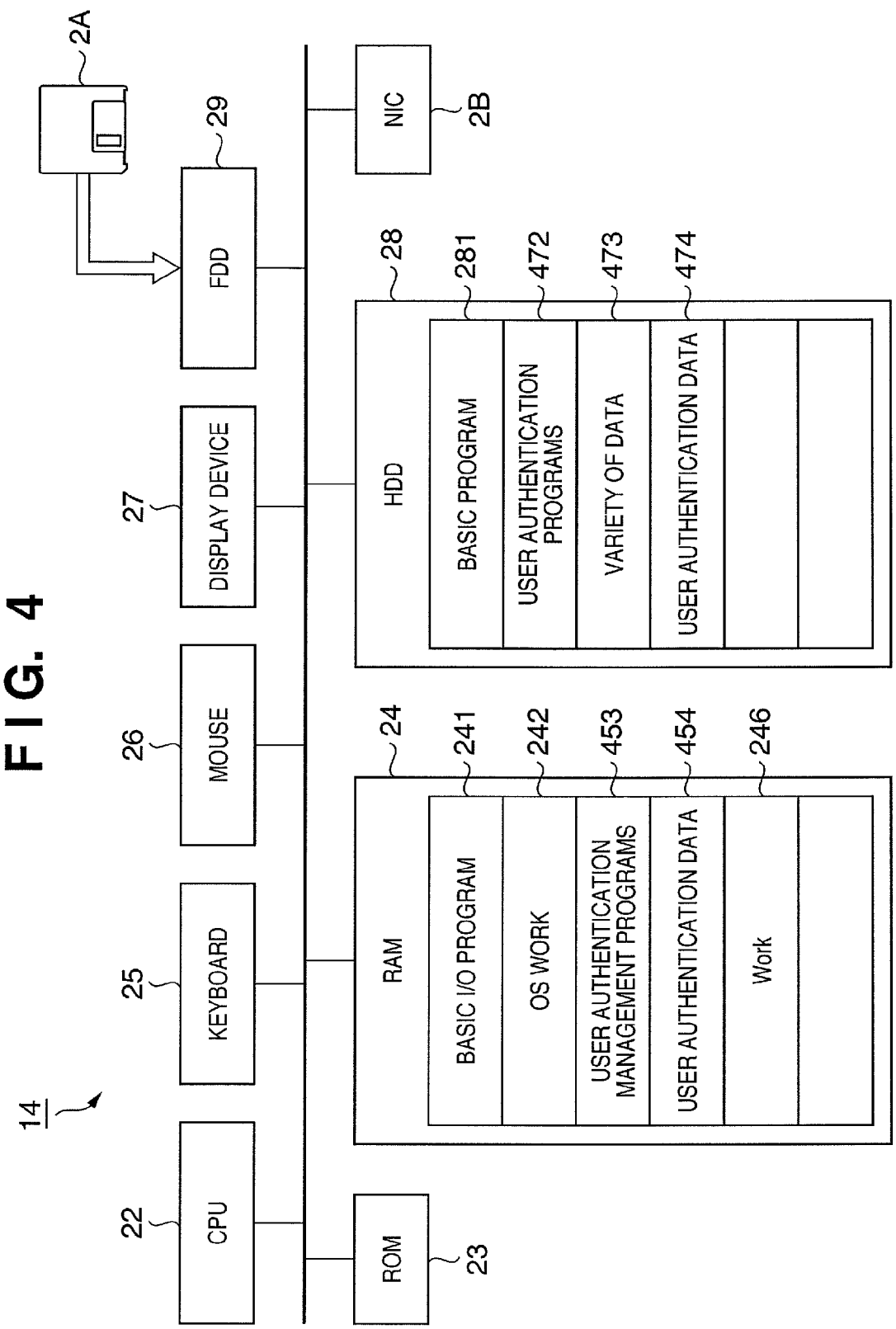
FIG. 4 is a block diagram describing the configuration of a user authentication server 14 according to the embodiment in further detail.

FIG. 4 is a block diagram describing the configuration of the user authentication server 14 according to this embodiment in further detail. The hardware configuration of the user authentication server 14 and the DMS server 12 may be similar to or different from each other. For convenience of description, it is assumed here that a similar hardware configuration is adopted. The parts already described are given like reference numerals to simplify the description.

A storage area 453 is an area into which user authentication programs 472 are loaded. A storage area 454 is an area into which data such as various types of data 473 required for the user authentication programs 472 to operate is loaded.

Exemplary user authentication programs 472 may include programs for communicating data with devices such as the DMS server 12 and the workflow server 15, performing user authentication, and managing user authentication data. The various types of data 473 is fixed data, such as resources required for the user authentication programs 472 to operate. User authentication data 474 include, for example, user IDs, passwords, division IDs, and chief IDs. An ID is an abbreviation for what is called identification information.

Figure 5:
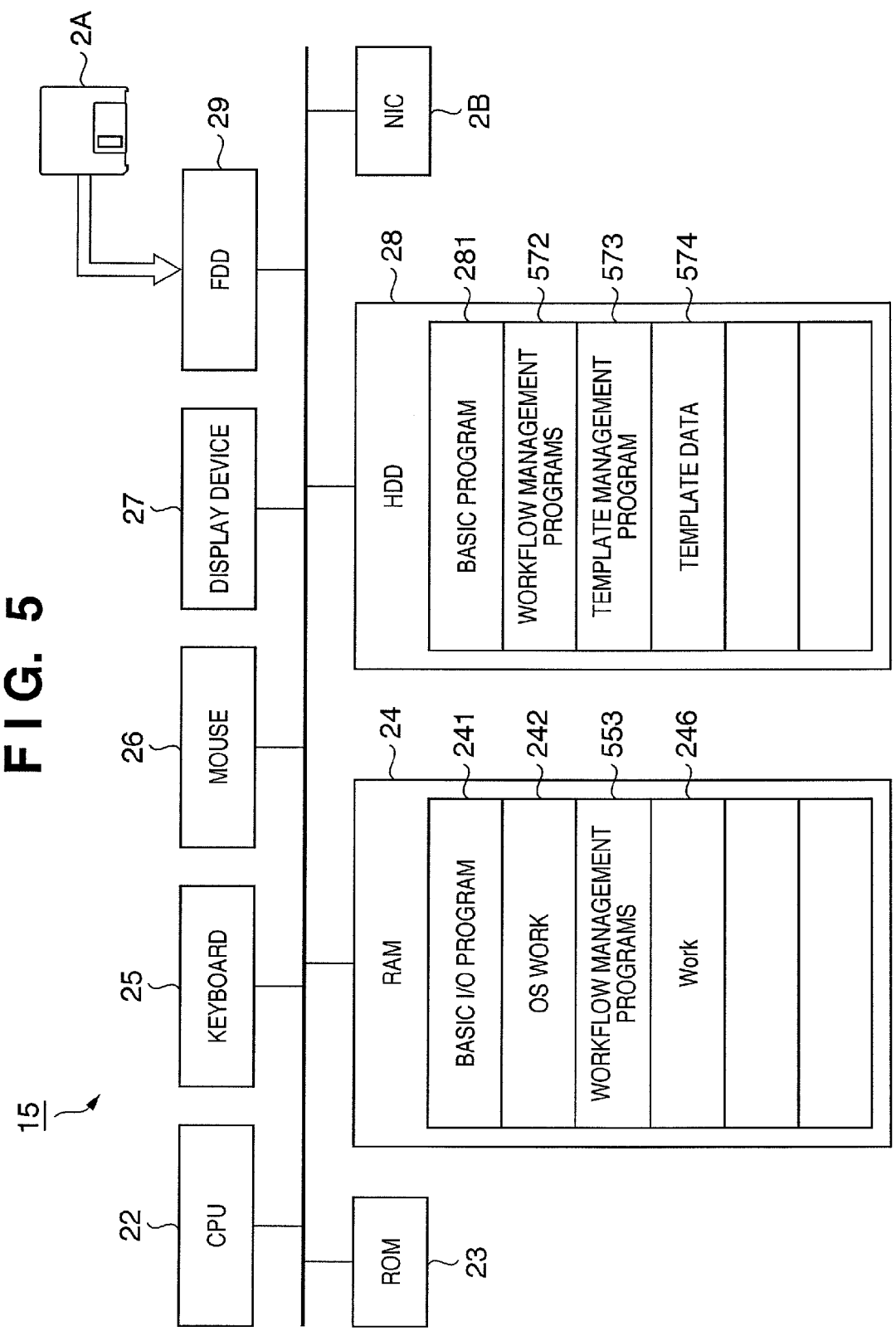
FIG. 5 is a block diagram describing the configuration of a workflow server 15 according to the embodiment in further detail.

FIG. 5 is a block diagram describing the configuration of the workflow server 15 according to this embodiment in further detail. The hardware configuration of the workflow server 15 and the DMS server 12 may be similar to or different from each other. For convenience of description, it is assumed here that a similar hardware configuration is adopted. The parts already described are given like reference numerals to simplify the description.

A storage area 553 is an area into which workflow management programs 572 are loaded. Exemplary workflow management programs 572 include a communication program for communicating data with devices such as the DMS server 12, and a program for generating appropriate definition information (a policy) from template data 574. The workflow management programs 572 may also include a program for registering the generated definition information with the access right management server 16. A template management program 573 is a program for registering and managing the template data 574. It is assumed that standard access right definition information is registered in the template data 574 in advance. Different template data 574 may be provided for different typical workflows.

Figure 6:
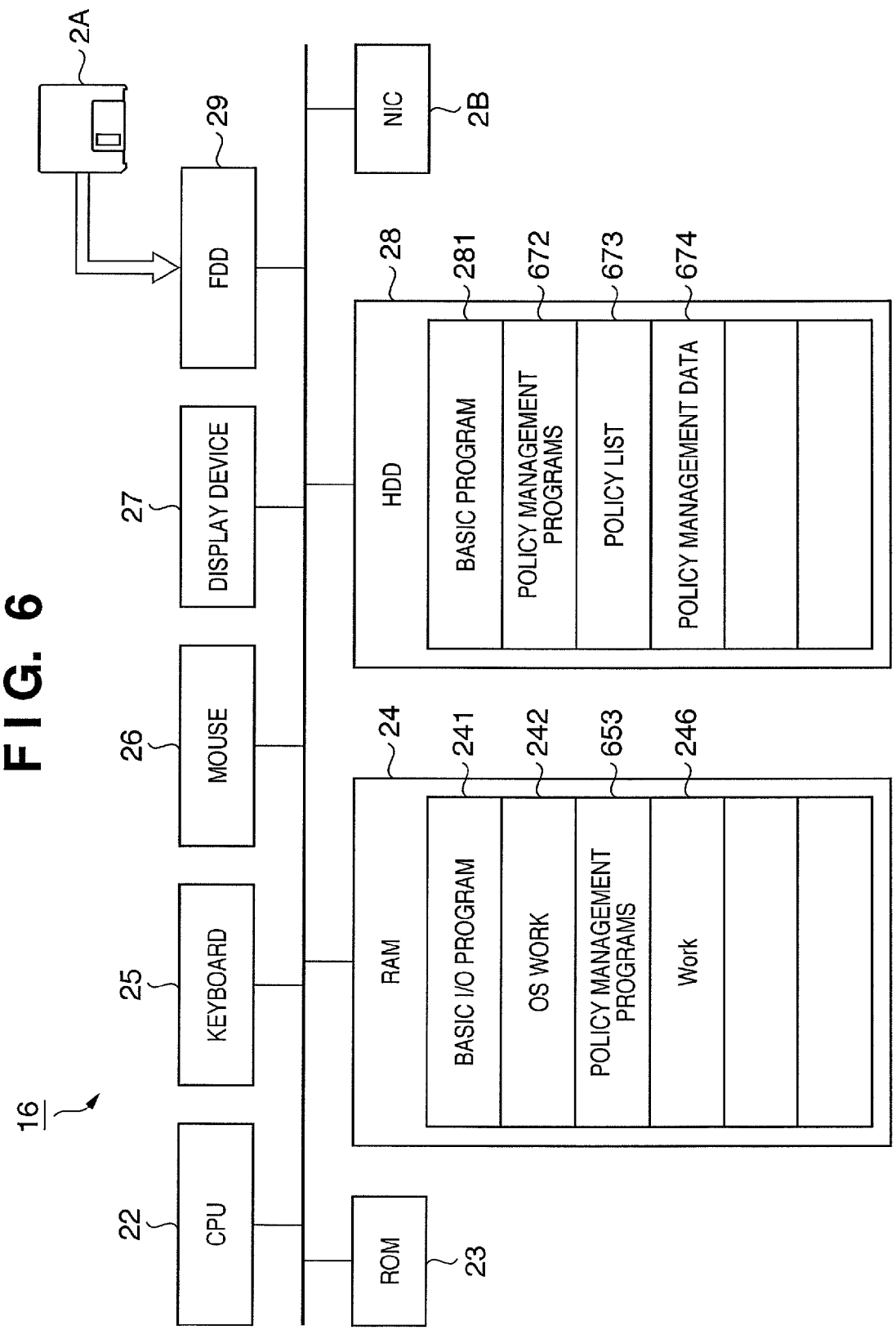
FIG. 6 is a block diagram describing the configuration of an access right management server 16 according to the embodiment in further detail.

FIG. 6 is a block diagram describing the configuration of the access right management server 16 according to this embodiment in further detail. The hardware configuration of the access right management server 16 and the DMS server 12 may be similar to or different from each other. For convenience of description, it is assumed here that a similar hardware configuration is adopted. The parts already described are given like reference numerals to simplify the description.

A storage area 653 in the RAM 24 is an area into which policy management programs 672 are loaded. Exemplary policy management programs 672 may include a communication program for communicating data with the DMS server 12, and a program for registering, editing, and managing definition information defining the access rights for electronic documents.

A policy list 673 is information for managing the definition information which defines the access right managed by the access right management server 16. Besides the definition information about electronic documents managed by the DMS server 12, the definition information about electronic documents managed by DMS servers in other networks may be registered with this policy list 673. Policy management data 674 contains the entities of the definition information. The policy list 673 and the policy management data 674 constitute an access right management database.

<Generation of Electronic Document for Use in Workflow>

Figure 7:
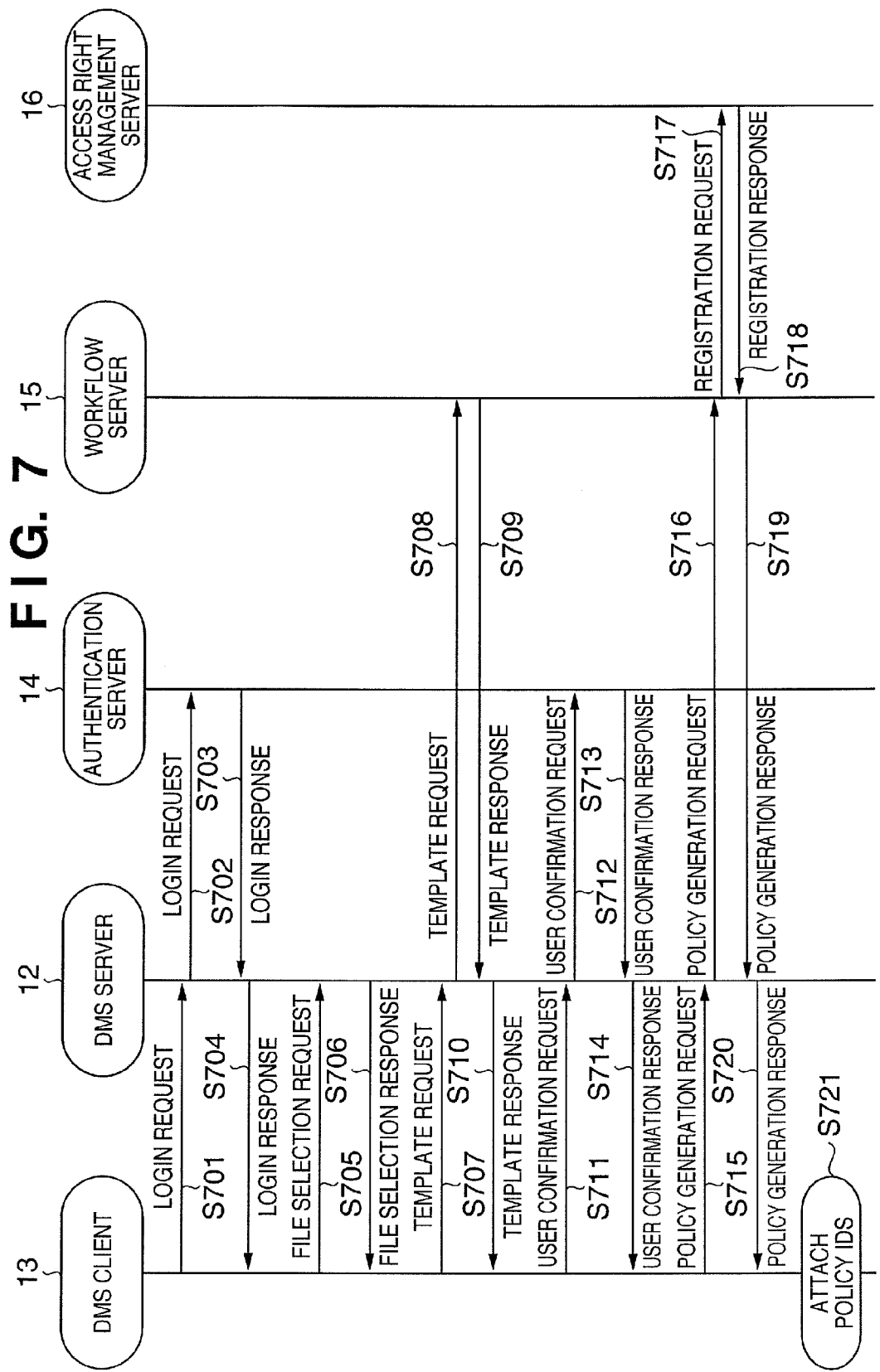
FIG. 7 is an exemplary sequence diagram showing the generation of an electronic document for a workflow according to the embodiment.

FIG. 7 is an exemplary sequence diagram showing the generation of an electronic document for a workflow according to this embodiment. It is assumed below that an original electronic document is stored in the DMS server 12 in advance. For example, the original electronic document may be an electronic document generated by certain application software executed at the DMS client 13. Alternatively, the original electronic document may be an electronic document such as an image file or a PDF file generated by the scanner 17 and stored in the DMS server 12.

It is to be understood that, in each sequence, the hardware subject is the CPU 22 and the software subject is any of the computer programs.

In step S701, the DMS client 13 transmits a login request to the DMS server 12 for accessing the electronic document stored in the DMS server 12. Data such as a user ID and a password may be transmitted along with the login request. The login request may be a connection request or an authentication request.

In step S702, the DMS server 12 receives the login request and transfers it to the user authentication server 14. In step S703, the user authentication server 14 performs authentication processing based on the received login request.

FIG. 8 is a diagram showing an example of the user authentication data 474 according to this embodiment. This example shows user information 801 and 802 for two users. For example, the user information 801 and 802 each includes the following attribute information. A user ID is unique identification information for identifying the user. A password is information such as a secret number known to only that user. A user name is the real name of the user, which may be displayed on a user interface of the DMS client 13. Division information is information, such as an abbreviation, about the division to which the user belongs. A division ID is information such as unique identification information representing the division to which the user belongs.

A sub-chief ID is a user ID of the sub-chief of the division to which the user belongs. A chief ID is a user ID of the chief of the division to which the user belongs. A treasurer ID is a user ID of a user who performs financial processing based on an electronic document (e.g., a purchase order). Authentication server information is information indicating the authentication server that manages this user information 801. The user information 802 contains information about the other user.

The user authentication server 14 checks whether the received user ID and password are registered with the user authentication data 474. If they match the registered information, the user authentication server 14 transmits to the DMS server 12 a login response indicating that the user is authorized. If they do not match the registered information, the user authentication server 14 transmits to the DMS server 12 a login response indicating that the user is unauthorized. It is assumed here that an authorized user is logging in.

In step S704, based on the received login response, the DMS server 12 determines whether a service can be provided to the DMS client 13. For an authorized user, the DMS server 12 transmits to the DMS client 13 a login response indicating that an access right to use the DMS database 284 is granted. For an unauthorized user, the DMS server 12 transmits a login response indicating that the login is rejected.

In step S705, the DMS client 13 transmits a file selection request to the DMS server 12. The file selection request is a request for selecting at least one of the electronic documents stored in the DMS server 12. Once succeeding in the login, the DMS client 13 can display a list of the electronic documents stored in the DMS server 12 to select among the documents.

In step S706, the DMS client 13 receives a file selection response from the DMS server 12. The file selection response is information indicating a success in the file selection.

In step S707, the DMS client 13 transmits a template request to the DMS server 12. A template is standard definition information provided in advance for facilitating the workflow and the generation of the access right definition information. In step S708, the DMS server 12 transmits the received template request to the workflow server 15. In step S709, the workflow server 15 reads out the template data 574 and transmits it to the DMS server 12. In step S710, the DMS server 12 transmits the template data to the DMS client 13.

The workflow server 15 may transmit one selected by the DMS client 13 among a plurality of template data candidates. Alternatively, the workflow server 15 may transmit all template data candidates to the DMS client 13. In the former case, the workflow server 15 will present the DMS client 13 with template names (e.g., purchase order template, approval template, etc.) in advance, among which any one will be selected.

FIG. 9 is a diagram showing an example of the template data according to this embodiment. To facilitate understanding of the concept of the template data, the template data is shown here in the form displayed on a user interface. Therefore, the data structure shown is not necessarily identical with the data structure in the HDD 28 of the workflow server 15.

User condition cells 901 contain a list of users among whom the electronic document is circulated in this workflow, and information on the circulation order. The present invention according to this embodiment is characterized in that the user condition cells contain user conditions rather than specific user names. A user condition may be said to be a search condition used to, for example, retrieve an actual user ID. Because the template data is reused by many users, it is preferable that the template data is general data. Therefore, information indicating a role such as "sub-chief", "chief", and "treasurer" is contained as the user conditions.

Cells 902 contain information representing the working statuses in the workflow. Cells 903 contain information defining the access right for each user participating in the workflow in a certain working status. In the example shown, a working status (1) indicates the state where the division sub-chief's approval for the electronic document is being waited for. A cell 904 contains the access right "approval allowed." Because the access rights of users other than the sub-chief are set to "reference" in the working status (1), these other users are not allowed to modify the electronic document but only allowed to display the electronic document.

A cell 905 contains the value "generator." A generator means a user who generates the electronic document to be circulated in the workflow. A cell 906 contains the information "(1)" indicating the order in the workflow, and the value "division chief." In particular, according to this template, a user ID assigned to the cell "generator" is used as a search key to search the user authentication data 474, so that data such as the ID of the chief for this user is obtained.

In step S710, the DMS client 13 receives a template response, reads out the template data from the template response, and displays the template data on the display device 27.

Displaying the template data in this manner allows the user to know the order in which the electronic document is circulated. In addition, it facilitates visually understanding what kind of access right is defined for each user in each working phase. At this stage, the DMS client 13 may modify the content of the template data under the operator's direction. If there is a plurality of template data candidates, the DMS client 13 may select one of the candidates.

In step S711, the DMS client 13 determines whether the users who match the user conditions in the selected template data really exist. For example, the DMS client 13 transmits to the DMS server 12 a user confirmation request containing the user ID of the user who is logging in (the generator) and the user conditions. The user conditions are "sub-chief", "chief", and "treasurer." The existence of the users described in the template should be confirmed because the electronic document cannot be circulated (the workflow cannot be executed) if the users do not exist.

In step S712, the DMS server 12 transmits the user confirmation request to the user authentication server 14. For example, the DMS server 12 queries the user authentication server 14 whether or not data such as the sub-chief ID corresponding to the generator's user ID is registered with the user authentication data 474. In step S713, the user authentication server 14 checks the existence of the users based on the received request. For example, assume that the generator's user ID is "IWDM-AAAA" and the user conditions are "sub-chief, chief, and treasurer." The existence of the sub-chief, chief, and treasurer can be confirmed from the user authentication data in FIG. 8 since their user IDs are all registered with the user authentication data. The user authentication server 14 then transmits to the DMS server 12 a user confirmation response containing the confirmation result.

In step S714, the DMS client 13 receives the user confirmation response from the DMS server 12. Based on the user confirmation response, the DMS client 13 determines whether or not all users participating in the workflow exist. If one or more users do not exist, the DMS client 13 may, for example, delete the user conditions and working statuses corresponding to those users. Alternatively, the user conditions may be changed to other conditions. For example, "sub-chief" may be changed to "assistant sub-chief." If a change is made, the user confirmation processing is again performed.

When the existence of all users is confirmed, in step S715, the DMS client 13 transmits a policy generation request to the DMS server 12. The policy generation request contains the template data. In step S716, the DMS server 12 transfers the policy generation request to the workflow server 15.

In step S717, according to the received policy generation request, the workflow server 15 generates access right definition information (i.e., a policy) for each working status. The workflow server 15 also assigns unique identification information (e.g., a policy ID) to each set of the definition information.

FIG. 10 is a diagram showing an example of the access right definition information according to this embodiment. The working statuses in this example includes: generating the document, (1) waiting for the sub-chief's approval, (2) waiting for the chief's approval, (3) waiting for the treasurer's approval, and (4) completed. In particular, the working status "waiting for the sub-chief's approval" will be described. Reference numeral 1000 denotes the access right definition information for "waiting for the sub-chief's approval." Reference numeral 1001 denotes the unique identification information for identifying this definition information. Reference numeral 1002 denotes a user condition and its access right in this working status. Reference numeral 1003 denotes that the access right is "approval allowed."

The example in FIG. 10 illustrates that one definition information set is generated for each of the five working statuses. However, the present invention is not limited to this, and the definition information may be further generated for each user. For example, for five users, a total of 25 definition information sets and their identification information will be generated.

The workflow server 15 transmits to the access right management server 16 a registration request containing the generated definition information and the identification information for the definition information. The access right management server 16 associates the received definition information with their identification information and adds the information to the policy list 673 and the policy management data 674. If identification information (a document ID) for the electronic document involved in the workflow is received from the DMS client 13, the access right management server 16 may associate the document ID, the definition information, and the policy IDs with each other and register them in the policy management data 674. On completion of addition, in step S718, the access right management server 16 transmits to the workflow server 15 a registration response indicating the completion of registration.

In step 719, the workflow server 15 generates a policy generation response containing the policy IDs for the respective working statuses and transmits it to the DMS server 12. In step S720, the DMS server 12 transmits the received policy generation response to the DMS client 13.

In step S721, the DMS client 13 generates a table for referring to the access right definition information and attaches the table to the electronic document. For example, the table is embedded to the electronic document.

Figure 11:
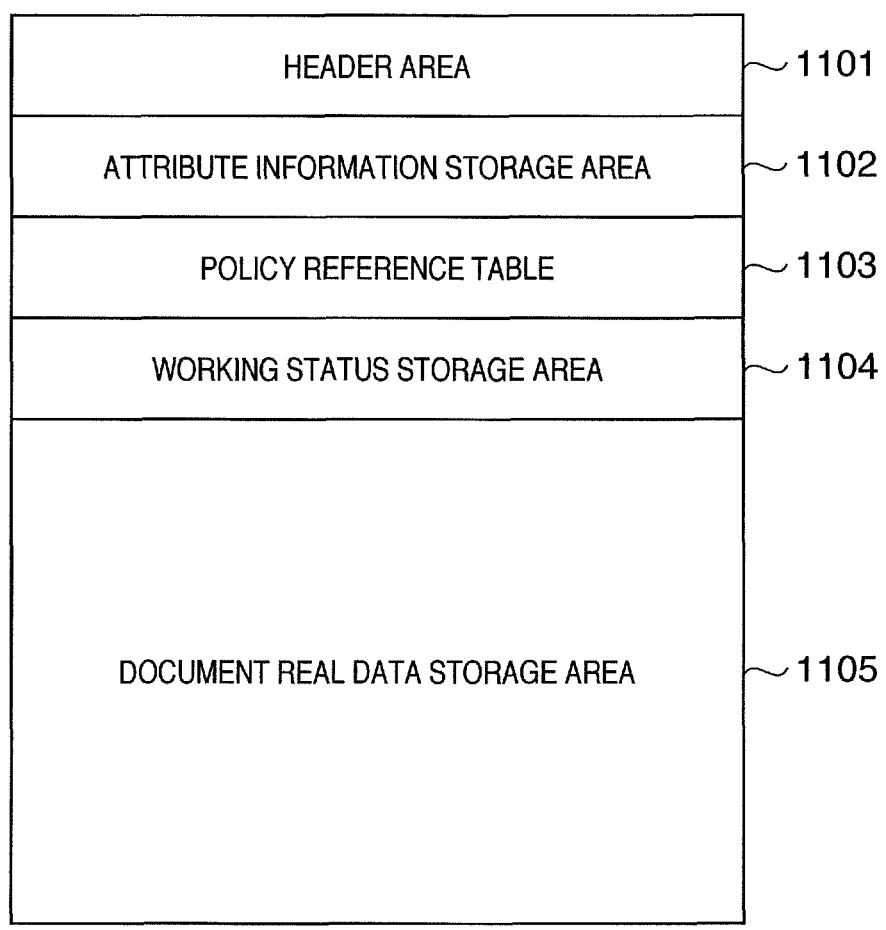
FIG. 11 is a diagram showing an example of the document structure of the electronic document according to the embodiment.

FIG. 11 is a diagram showing an example of the document structure of the electronic document according to this embodiment. A header area 1101 contains identification information (a document ID) for the electronic document, information indicating the size of the electronic document, and other information. An attribute information storage area 1102 contains information such as the name of the electronic document, index information, the date of generation, and the date of update. These information items may be displayed by using, for example, a user interface of the DMS client programs 372. A policy reference table 1103 is an area containing the policy IDs used for referring to the access right definition information.

A working status storage area 1104 contains information such as "approved", "rejected", and "unapproved", which is the operation result in each working status. The DMS client 13 can determine the current working status in the workflow from the working status storage area 1104. A document real data storage area 1105 contains data, for example, the body of the electronic document, image data, and application data.

FIG. 12 is a diagram showing an example of the policy reference table according to this embodiment. Reference numeral 1201 denotes that the policy ID for the first working status "waiting for the sub-chief's approval" is "policy 01."

If any user attempts to access this electronic document, the DMS client 13 reads out the policy ID corresponding to the current working status from the reference table 1103 and queries the access right management server 16. The document ID may also be transmitted together. The access right management server 16 reads out the definition information corresponding to the received policy ID (and the document ID) and transmits the definition information to the DMS client 13.

FIG. 13 is an exemplary flowchart showing processing in the DMS client according to this embodiment. This processing is part of the processing implemented by the DMS client programs 372.

In step S1301, the CPU 22 performs login processing according to a direction entered via the keyboard 25 or the mouse 26. For example, assume that a user interface provided by the display device 27 or other devices includes a workflow start button. Then, pressing the start button causes the CPU 22 to display a dialog box on the display device 27 for entering a user ID and a password. The CPU 22 transmits the entered user ID and password to the DMS server 12 via the NIC 2B. When a login response indicating the success in the login is received from the DMS server 12, the process proceeds to step S1302.

In step S1302, the CPU 22 selects a certain electronic document stored in the DMS server 12 according to a direction via the keyboard 25 or the mouse 26. Alternatively, an electronic document may be generated from an original document image read through the scanner 17. A plurality of electronic documents may be selected rather than only one electronic document.

In step S1303, the CPU 22 selects the template data for defining the access rights in each working status. For example, the CPU 22 receives a plurality of template data sets prepared in advance from the workflow server 15 via the DMS server 12 and displays the content of the data on the display device 27. The CPU 22 selects one of the template data sets according to a direction via the keyboard 25 or the mouse 26.

In step S1304, the CPU 22 determines whether users defined in the selected template data really exist. The users mean those other than the generator who are to participate in the workflow (e.g., the sub-chief, chief, and treasurer). The CPU 22 transmits to the DMS server 12 a user confirmation request containing, for example, the selected template data and the user ID of the user who is logging in. Instead of the template data itself, the user conditions such as "sub-chief", "chief", and "treasurer" may be transmitted.

If a response indicating the existence of all users is received from the DMS server 12, the process proceeds to step S1305. If one or more users do not exist, the process proceeds to step S1310 to perform error processing. For example, the CPU 22 may display on the display device 27 a message indicating the nonexistence of one or more users or a message prompting modification of the template data.

In step S1305, the CPU 22 transmits a policy ID generation request for the selected template to the workflow server 15 via the DMS server. The CPU 22 receives policy IDs for respective working statuses from the workflow server 15 via the DMS server.

In step S1306, the CPU 22 generates a policy reference table (FIG. 12) based on the received policy IDs. The CPU 22 preferably writes the user ID of the operator who is logging in to the generator cell in the policy reference table. The CPU 22 further attaches the generated policy reference table to the electronic document. For example, the CPU 22 stores the generated reference table in a storage area as shown in FIG. 11. The CPU 22 also writes information indicating the next working status to the working status storage area 1104 of the electronic document.

In step S1307, the CPU 22 registers the generated electronic document with the DMS server 12. The DMS server 12 maintains the generated electronic document as an electronic document for the workflow.

In this manner, the electronic document is provided with the policy IDs for the respective working statuses. The access right definition information corresponding to each policy ID is stored in the access right management server 16. Thus, the initial stage of the workflow finishes.

<Acquisition of Access Right in Workflow>

Figure 14:
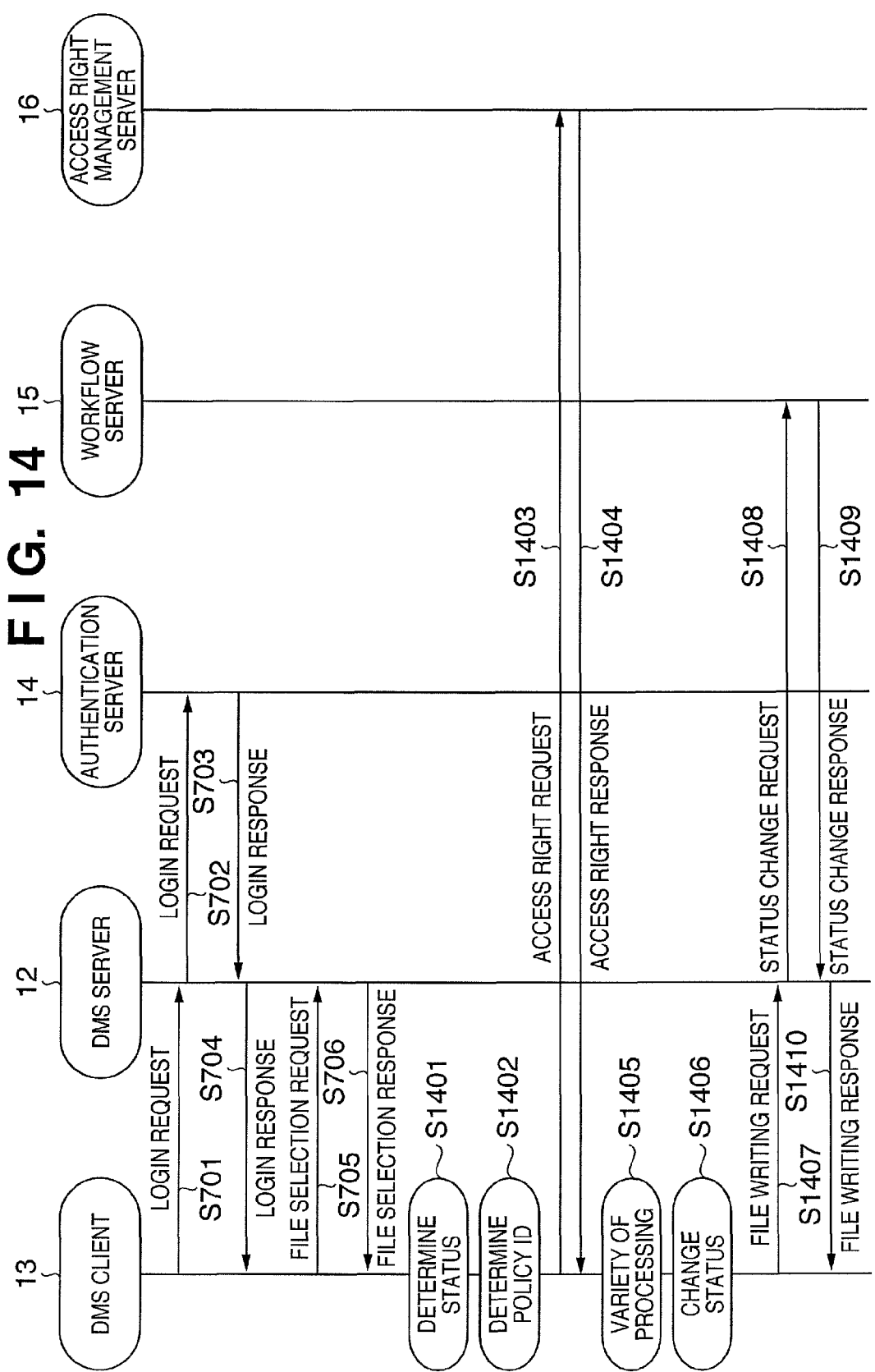
FIG. 14 is a sequence diagram showing an example of a workflow in the embodiment.

FIG. 14 is a sequence diagram showing an example of a workflow in this embodiment. The parts identical with those already described are given like reference numerals to omit the description thereof.

By way of example, it is assumed here that an e-mail arrives at the sub-chief's e-mail address from the workflow server 15, requesting participation in the workflow. The e-mail contains a hyperlink to an electronic document to be circulated by the workflow. Clicking on the hyperlink by the mouse 26 causes the electronic document stored in the DMS server 12 to be selected (S701 to S706).

The way of calling for participation in the workflow is not limited to an e-mail but also includes the use of means such as the Web. In the case of the Web, the DMS client 13 will access a Web page containing the hyperlink to the electronic document.

In step S1401, the DMS client 13 determines the current working status by reading out the information indicating the working status from the working status storage area 1104 of the electronic document.

In step S1402, the DMS client 13 determines the policy ID corresponding to the current working status from the policy reference table 1103. In step S1403, the DMS client 13 transmits to the access right management server 16 an access right request containing the user ID, document ID, and policy ID. The access right management server 16 retrieves the user ID, document ID, and policy ID from the received access right request. The access right management server 16 further uses the document ID and policy ID to extract the access right definition information from the policy list 673 and the policy management data 674.

In step S1404, the access right management server 16 transmits the extracted access right definition information as an access right response to the DMS client 13. In step S1405, the DMS client 13 controls operations on the electronic document based on the received access right definition information. The DMS client 13 obtains the user ID of the generator of the electronic document, for example from the generator cell in the definition information or from the attribute information storage area 1102 of the electronic document.

Based on the generator's user ID, the DMS client 13 obtains the user IDs of other users participating in the workflow, such as the sub-chief, from the user authentication server 14. Thus, all user IDs in the definition information are determined. The DMS client 13 further compares the user ID of the operator who is logging in and the user IDs in the access right definition information. If there is a matching user ID in the definition information, the access right corresponding to that user ID is determined from the definition information.

For example, assume that the current working status is "waiting for the sub-chief's approval", and the sub-chief (user ID: IWDM-BBBB) is the login user, and the generator of the electronic document is a subordinate (user ID: IWDM-AAAA) of the sub-chief.

In this case, based on the user ID "IWDM-AAAA", the user IDs of the sub-chief, chief, and treasurer are obtained from the user authentication data in FIG. 8. The CPU 22 confirms that the obtained user ID of the sub-chief (IWDM-BBBB) matches the user ID of the operator who is logging in (the sub-chief). Then, it can be seen from the definition information 1000 in FIG. 10 that the sub-chief's access right in the current working status is "approval allowed." Therefore, the sub-chief can use the DMS client 13 to perform approval processing.

In step S1405, the DMS client 13 performs various kinds of processing according to the access right of the user who is logging in. For example, the DMS client 13 performs reference processing or approval processing on the electronic document according to the access right.

In step S1406, when detecting the completion of the operation on the electronic document, the DMS client 13 rewrites the information about the working status of the electronic document as necessary. For example, if the sub-chief's approval is completed, the DMS client 13 changes the working status of the electronic document to the next working status "waiting for the chief's approval." More specifically, the DMS client 13 writes information indicating that the sub-chief has approved to the working status storage area 1104. It is to be understood that the information indicating the sub-chief has approved implies "waiting for the chief's approval." Also, the change in the working status causes the sub-chief's access right to be changed to "reference."

The change in the working status also causes a change in the policy ID read out next from the reference table. This means that the access right definition information is dynamically changed according to the change in the working status.

In step s1407, the DMS client 13 transmits an electronic document writing request to the DMS server 12. The DMS server 12 overwrites the electronic document. Further in step S1408, when detecting the change in the working status of the electronic document, the DMS server 12 notifies the workflow server 15 of the change in the working status. The workflow server 15 performs an operation according to the changed working status, such as transmitting an e-mail or generating a Web page. In the above example, the workflow server 15 transmits to the chief's e-mail address an e-mail that contains a message prompting approval of the electronic document. Of course, the e-mail contains the hyperlink to the electronic document.

In step S1409, the workflow server 15 transmits a response indicating the completion of the status change to the DMS server 12. In step S1410, the DMS server 12 transmits a response indicating the completion of the status change to the DMS client 13.

Figure 15:
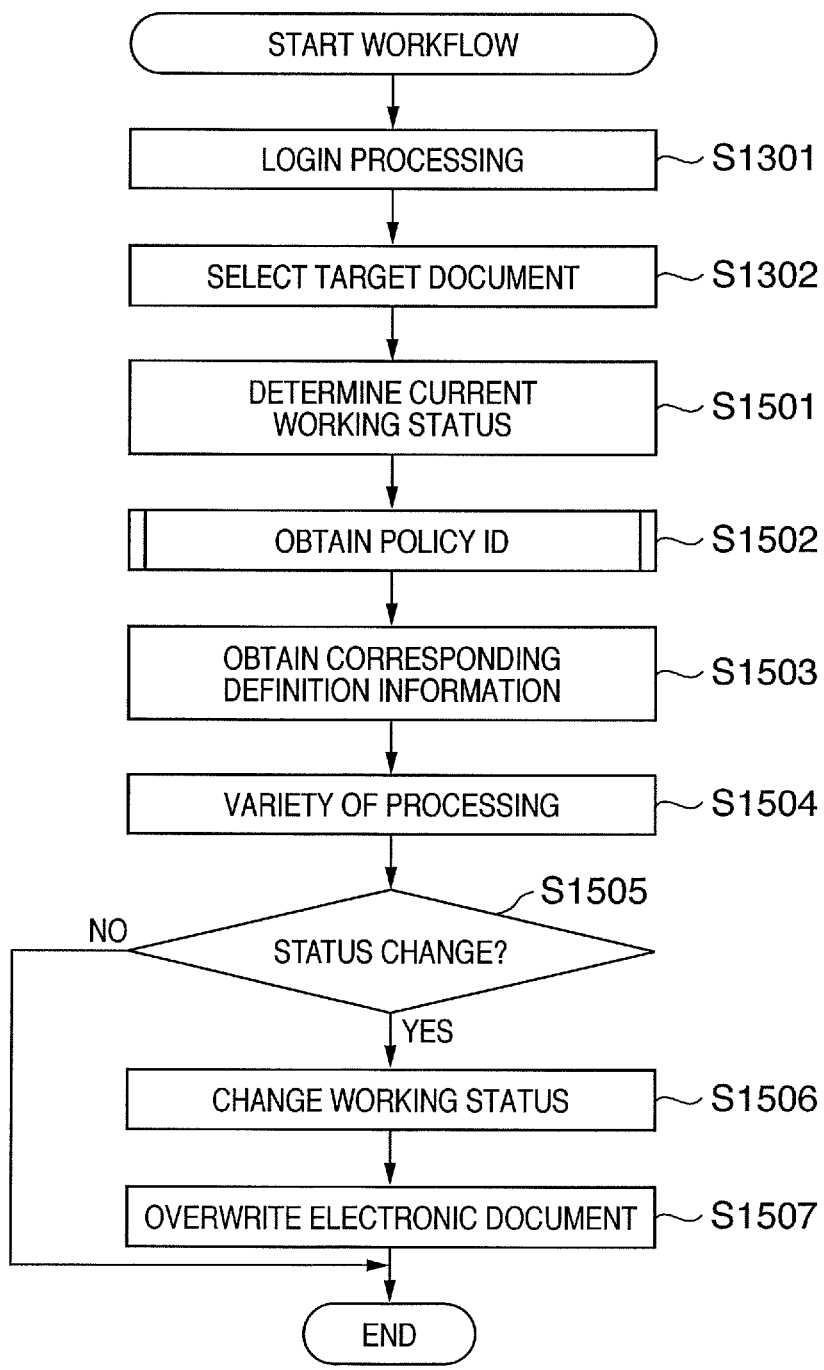
FIG. 15 is an exemplary flowchart for a workflow according to the embodiment.

FIG. 15 is an exemplary flowchart showing processing in the DMS client 13 for a workflow according to this embodiment. The parts identical with those already described are given like reference numerals to omit the description thereof. It is assumed that the login processing has been finished. It is also assumed that the target document has been selected by clicking on the above-described hyperlink contained in an e-mail.

In step S1501, the CPU 22 of the DMS client 13 determines the current working status by reading out the information indicating the working status from the working status storage area 1104 of the selected electronic document.

In step S1502, the CPU 22 performs processing for obtaining the policy ID. For example, the CPU 22 reads out the policy ID corresponding to the current working status from the policy reference table 1103.

In step S1503, the CPU 22 obtains the access right definition information corresponding to the determined policy ID from the access right management server 16. In step S1504, the CPU 22 performs a various kinds of processing according to the obtained definition information. The CPU 22 may control the user's operations by displaying functions permitted to operate in a menu and graying out functions not permitted to operate in the menu.

In step S1505, the CPU 22 determines whether or not to change the working status of the electronic document. For example, if the sub-chief has given approval in step S1504, the CPU 22 determines that the working status should be changed and proceeds to step S1506. If the electronic document has only been referred to, the CPU 22 does not determine that the working status should be changed. When the working status should not be changed, the CPU 22 skips the change processing and terminates the processing for this flowchart.

In step S1506, the CPU 22 changes the working status of the electronic document. For example, if the sub-chief's approval is completed, the CPU 22 changes the working status of the electronic document to "waiting for the chief's approval." More specifically, the CPU 22 rewrites the information in the working status storage area 1104 with information indicating the next working status (e.g., the information indicating that the sub-chef has approved). In step S1507, the CPU 22 writes the electronic document with the changed working status to the DMS server 12.

Figure 16:
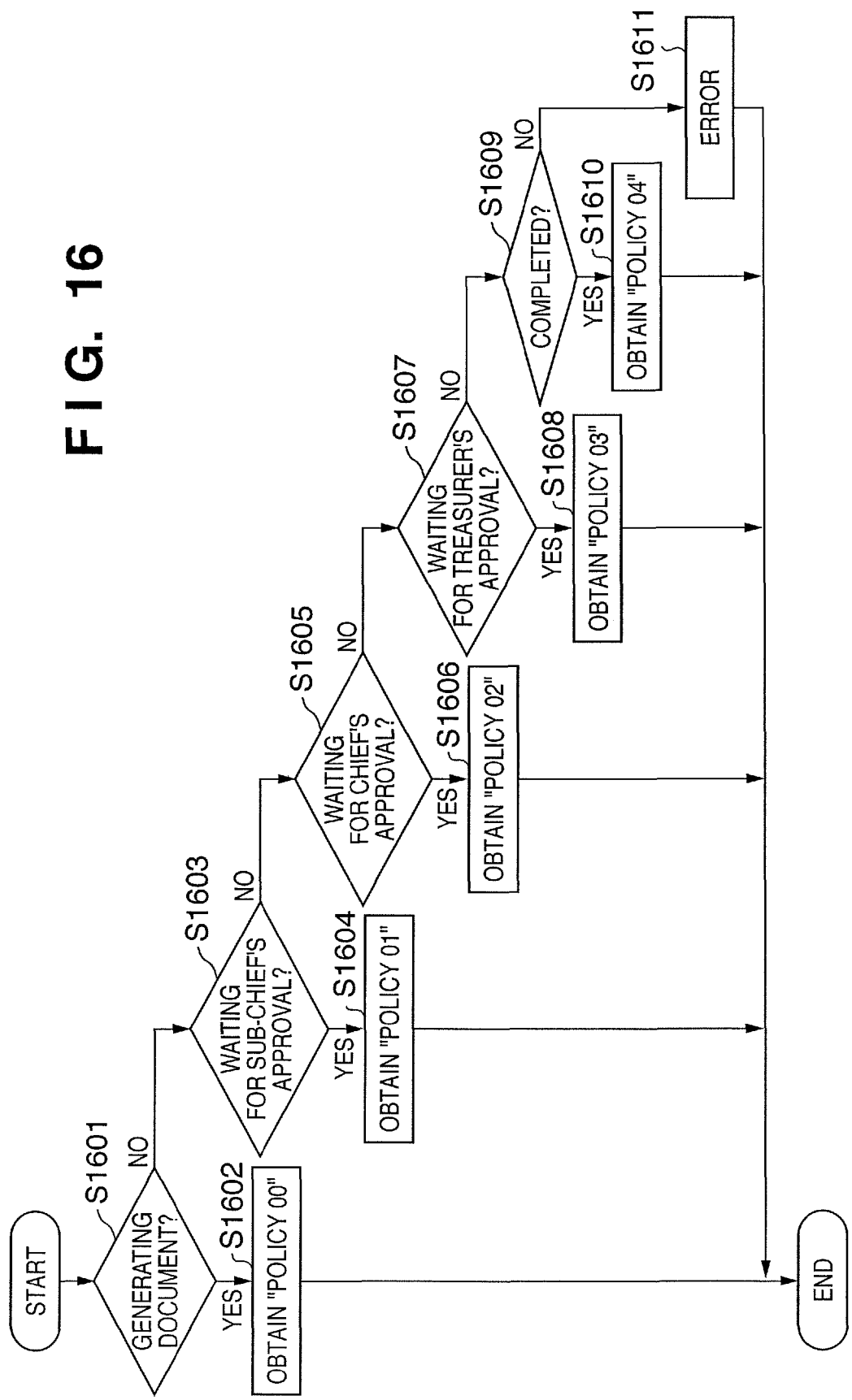
FIG. 16 is an exemplary flowchart of determining a policy ID according to the embodiment.

FIG. 16 is an exemplary flowchart of determining the policy ID according to this embodiment. This flowchart is a more detailed description of the steps S1402 and S1502. It is assumed that this embodiment has the working statuses "generating the electronic document", "waiting for the sub-chief's approval", "waiting for the chief's approval", "waiting for the treasurer's approval", and "completed."

In step S1601, the CPU 22 determines whether the current working status is "generating the electronic document." If that is the case, the process proceeds to step S1602 and the CPU 22 obtains the corresponding policy "policy 00" from the policy reference table 1103.

If the current working status is not "generating the electronic document", the process proceeds to step S1603 and the CPU 22 determines whether the current working status is "waiting for the sub-chief's approval." If that is the case, the process proceeds to step S1604. In step S1604, the CPU 22 obtains the corresponding policy ID "policy 01" from the policy reference table 1103.

If the current working status is not "waiting for the sub-chief's approval", the process proceeds to step S1605 and the CPU 22 determines whether the current working status is "waiting for the chief's approval." If that is the case, the process proceeds to step S1606. In step S1606, the CPU 22 obtains the corresponding policy ID "policy 02" from the policy reference table 1103.

If the current working status is not "waiting for the chief's approval", the process proceeds to step S1607 and the CPU 22 determines whether the current working status is "waiting for the treasurer's approval." If that is the case, the process proceeds to step S1608. In step S1608, the CPU 22 obtains the corresponding policy ID "policy 03" from the policy reference table 1103.

If the current working status is not "waiting for the treasurer's approval", the process proceeds to step S1609 and the CPU 22 determines whether the current working status is "completed." If that is the case, the process proceeds to step S1610. In step S1610, the CPU 22 obtains the corresponding policy ID "policy 04" from the policy reference table 1103. If that is not the case, the process proceeds to step S1611 and the CPU 22 performs error processing.

As has been described, according to this embodiment, a change in the working status of an object such as an electronic document causes the access rights applied to the object to be dynamically modified. In a workflow system that processes an object according to a workflow having a plurality of working statuses, this will appropriately prevent tampering after approval is given.

The definition information defining the access rights in each working status, like the template data, is stored in advance in the workflow server 15. This advantageously facilitates acquisition of the definition information corresponding to the current working status. That is, because generating the definition information from scratch is a significant burden, having the templates of standard definition information will considerably reduce the burden on the generator.

The policy reference table containing registered policy IDs for identifying the definition information corresponding to each working status is attached in advance to the electronic document. This allows the policy IDs to be readily obtained. Because the electronic document does not contain the definition information itself, the definition information can be modified without editing the electronic document but only with editing the definition information in the access right management server 16.

The DMS client 13 can readily determine the current working status by reading out the information for determining the current working status contained in the electronic document. This is also advantageous in that even the DMS client 13 can determine the current working status.

To determine whether or not to change the working status, the DMS client 13 may detect the termination of the current working status. When the termination is detected, the DM5 client 13 rewrites the information for determining the current working status contained in the electronic document with information indicating the next working status. Thus, the current working status is always kept up-to-date.

The DMS client 13 is also a generating apparatus that generates an object to be processed according to a workflow having a plurality of working statuses. That is, the DMS client 13 obtains the policy IDs for identifying the access right definition information applied to the respective working statuses. Then, the DMS client 13 attaches the obtained policy IDs to the object such as an electronic document. Thus, the access right definition information corresponding to each working status can be indirectly associated with the electronic document to be circulated in the workflow.

The DMS client 13 also stores information for identifying the current working status among those working statuses in the working status storage area 1104 of the electronic document. Thus, the current working status can be readily determined.

As an example has been shown in FIG. 9, the template data describes the combination of the transition order of the working statuses and the search conditions for the operator who should operate the electronic document in each working status. The DMS client 13 selects a template desired by the user from a plurality of templates. The DMS client 13 then registers the access right definition information according to the selected template with the access right management server 16. As described above, having a plurality of templates reduces the burden on the user.

The templates and the definition information do not directly contain the user IDs of operators other than the generator. That is, the search conditions for the operators (user conditions) are used with the identification information about the generator of the electronic document who starts the workflow, and thereby the unique user IDs of the operators are determined. In this manner, the generality of the templates and the definition information is advantageously increased.

Second Embodiment

The above-described embodiment has assumed that the DMS client 13 can connect to the DMS server 12. Typically, servers like the DMS server 12 are often closed to external dealers. This is because the security level will decrease if the workflow system is open to the external dealers. Thus, if there is an external dealer among the operators participating in the workflow, the external dealer cannot participate in the workflow because he cannot access the DMS server 12.

Even when an electronic document is circulated among workers in the same company, the workflow may not be able to be executed if one or more workers participating in the workflow are outside the office. Generally, workers outside the office may be able to access a mail server in the company by using a mobile phone or a mobile tool. However, they may not be allowed to access servers like the DMS server. This is prevention against leakage of confidential documents to the outside of the company. Therefore, the workflow may not be executed smoothly in such a case as well. In particular, an urgent purchase-order cannot be approved if a boss is in a mobile environment, and this will be very inconvenient.

In a second embodiment, an example for solving at least part of these problems will be presented. The parts already described in the first embodiment will be only briefly described. That is, what has been modified from the first embodiment will mainly be described.

Figure 17:
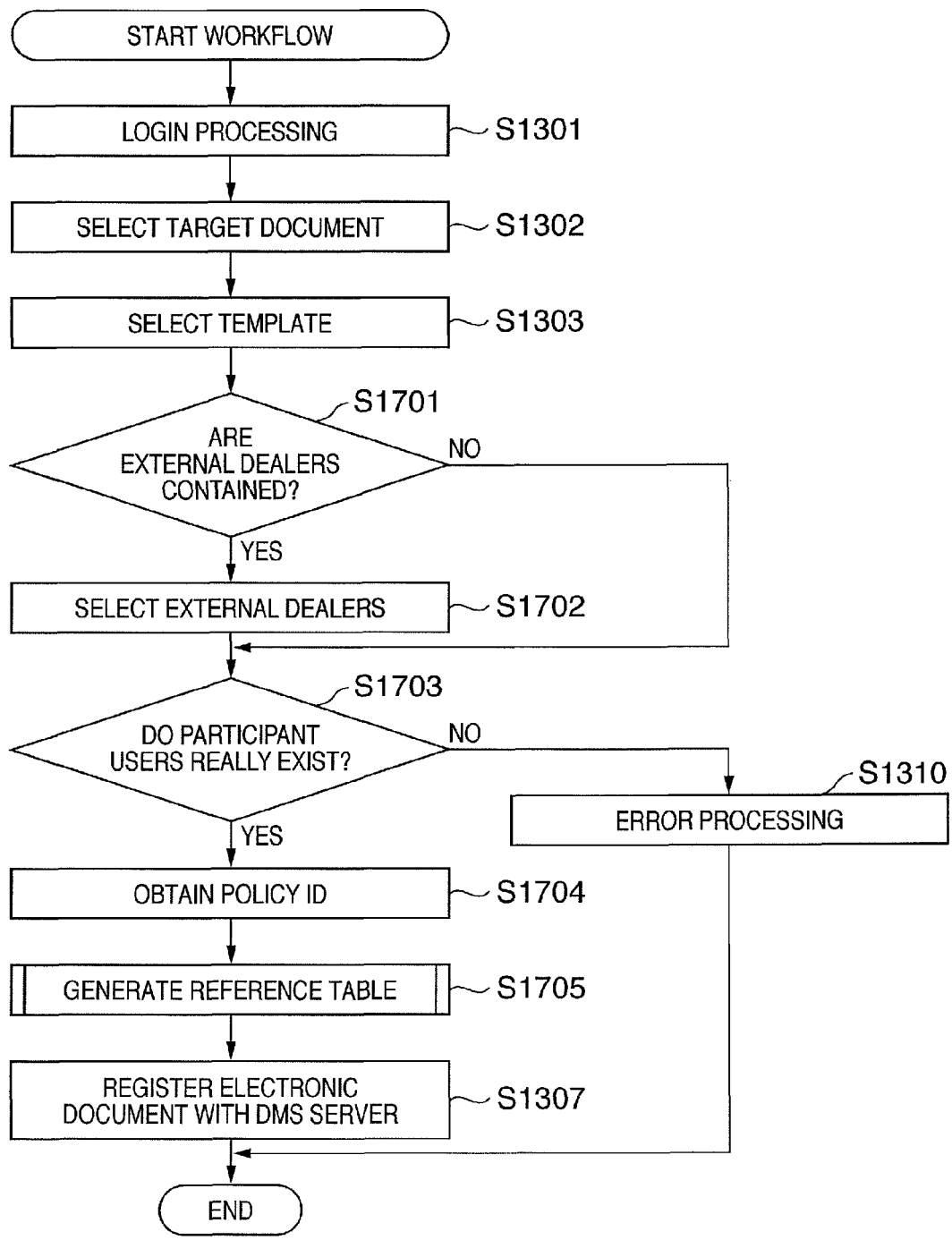
FIG. 17 is an exemplary flowchart showing processing in the DMS client according to an embodiment.
Figure 18:
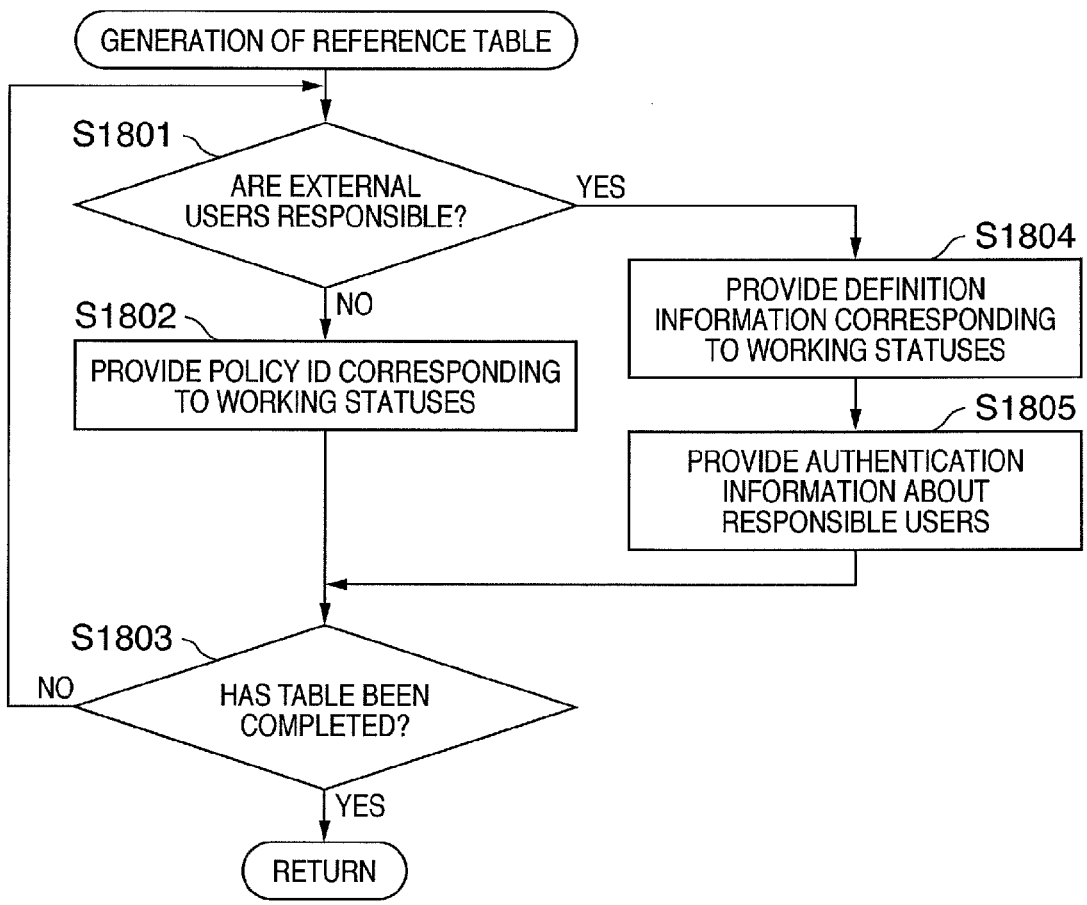
FIG. 18 is an exemplary flowchart showing the generation of the policy reference table according to the embodiment.

FIG. 17 is an exemplary flowchart showing processing in the DMS client according to this embodiment. FIG. 18 is an exemplary flowchart showing the generation of the policy reference table according to this embodiment.

In step S1701, the CPU 22 of the DMS client 13 determines whether or not the selected template contains working statuses involving users such as external dealers (including external dealers and offline users).

Figure 19:
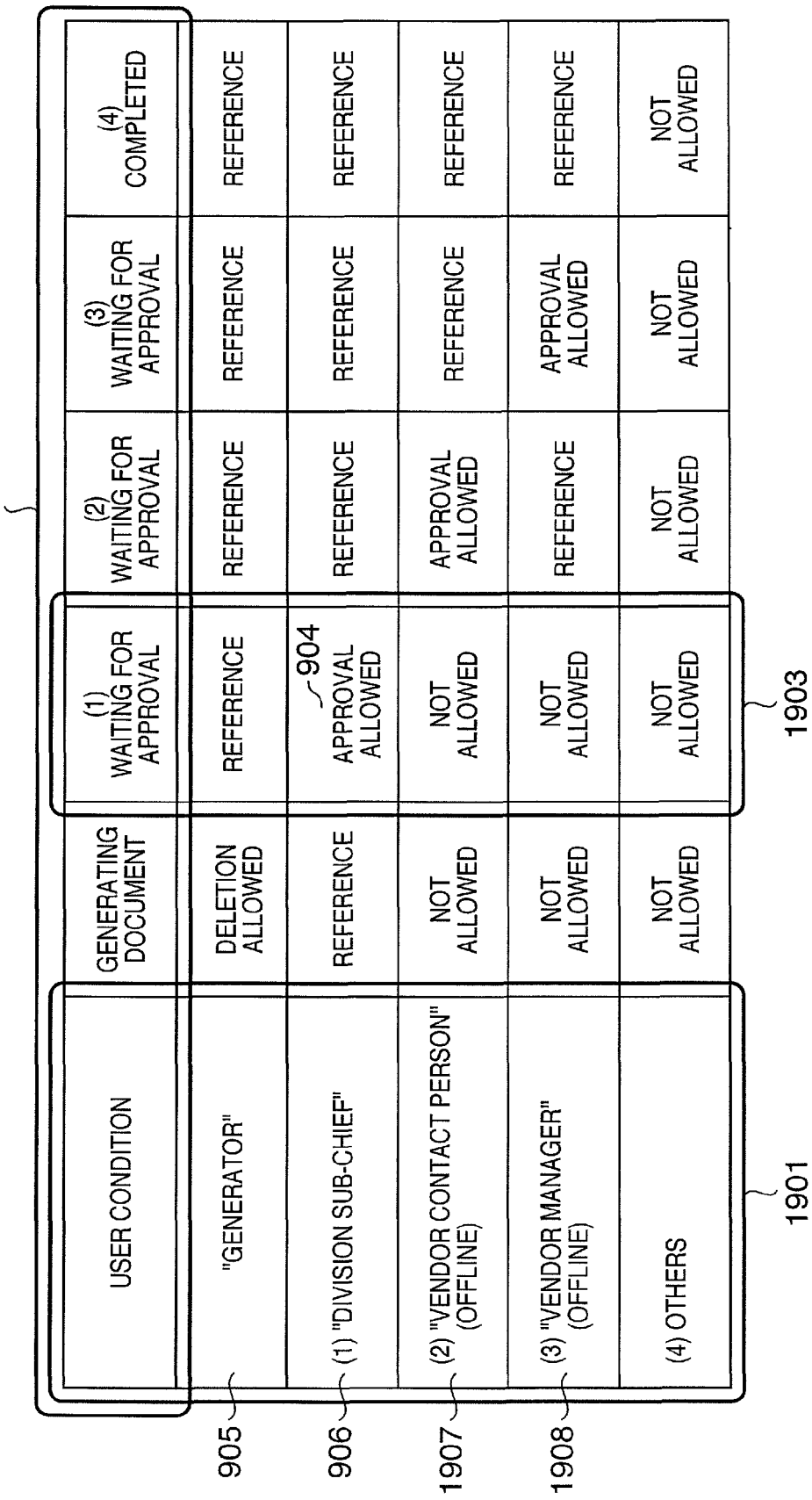
FIG. 19 is a diagram showing another example of the template data according to the embodiment.

FIG. 19 is a diagram showing another example of the template data according to this embodiment. Compared with the template data in FIG. 9, it can be seen that two working statuses to be processes by offline users such as external dealers are contained. The offline users in this example are a vendor contact person 1907 and a vendor manager 1908. At this point, unique user IDs are not yet registered for the vendor contact person 1907 and the vendor manager 1908. It is also shown that, according to the working status 1903, the vendor contact person 1907 and the vendor manager 1908 cannot operate the electronic document in this working status. If the template does not contain users such as external dealers, the process proceeds to step S1703.

If the template contains users such as external dealers, the process proceeds to step S1702 and the CPU 22 selects the specific users such as external dealers. For example, the CPU 22 obtains a list of registered users such as external dealers from the user authentication server 14 and displays the list on the display device 27. Then, according to a selection via the mouse 26 or the like, the CPU 22 temporarily stores in the RAM 24 the user IDs and authentication information (e.g., passwords) of the users such as external dealers selected from the list.

At this point, the CPU 22 may directly write the user IDs (e.g., Mary, Tom, etc.) of the users such as external dealers to the template data. The CPU 22 may further transmit this template data to the workflow server 15 via the DMS server 12 (S715, S716).

The selection of the users such as external dealers is repeated according to the number of the users such as external dealers (e.g., the vendor contact person 1907 and the vendor manager 1908) in the template data.

FIG. 20 is a diagram showing another example of the user authentication data according to this embodiment. Compared with the user authentication data shown in FIG. 8, the user authentication data shown in FIG. 20 has an additional item (hereinafter, the user type item 2001) indicating the user type. For example, information such as in-company 2002 and external dealer 2003 may be possible for the user type item 2001. User information 2004 and 2005 about the external dealer is also added to the user authentication data. The database for managing in-company users and the database for managing external dealers may be provided separately or provided as an integrated database.

In step S1703, the CPU 22 determines whether the participant users really exist. For in-company users, processing is performed as described for step S1304. For external dealers, it is determined whether they are existing users based on, for example, the external dealer list. For offline in-company users, processing is performed as in step S1304. If one or more users do not exist, the process proceeds to step S1310 and the CPU 22 performs error processing.

If all participant users exist, the process proceeds to step S1704 and the CPU 22 obtains the policy IDs for the working statuses processed by the in-company online users. The details of step S1704 may adopt processing similar to that in step S1305. Acquisition of the policy IDs for the external dealers is omitted.

As described in FIG. 7, the workflow server 15 receives the policy generation request and generates the access right definition information in each working status based on the selected template data. Each set of the generated definition information is provided with a policy ID.

FIG. 21 is a diagram showing an example of the definition information generated for each working status according to this embodiment. In particular, reference numeral 2101 denotes the definition information for the working status "waiting for the sub-chief's approval." It will be noted from FIG. 21 that the "division sub-chief" is responsible for this working status. Also, it will be recognized that the sub-chief's access right is "approval allowed." On the other hand, reference numeral 2110 denotes the definition information for the working status "waiting for the vendor contact person's approval." In this example, the "vendor contact person" is "Mary." In the working status "waiting for the vendor contact person's approval", only Mary has the access right "approval allowed." Further, because the access rights of the users other than Mary are restricted to "reference" in this working status, frauds such as tampering can be prevented.

The generated definition information and policy IDs are registered with the access right management server 16 (S717, S718). The DMS client 13 is informed of the policy IDs for the respective working statuses.

In step S1705, the CPU 22 generates the policy reference table to be attached to the electronic document circulated in the workflow. In step S1307, the electronic document generated for the workflow is registered with the DMS server 12.

<Generation of Policy Reference Table>

A specific example for step S1705 will be further described in detail by using FIG. 18. In step S1801, the CPU 22 of the DMS client 13 refers to the selected template data and determines whether or not any working status involves a user such as an external dealer. For example, according to FIG. 19, it is determined that the user responsible for the first working status is an in-company user since the user is the "division sub-chief." Then, the process proceeds to step S1802 and the CPU 22 registers the policy ID corresponding to the working status in the policy reference table. It is to be understood that this policy ID has been received from the workflow server 15.

FIG. 22 is a diagram showing an example of the policy reference table according to this embodiment. It can be seen from the user condition cells 2200 that, for the responsible users such as external dealers, the user IDs (e.g., Mary, Tom) are directly registered as the user conditions. This is because the offline DMS client 13 cannot access the user authentication server 14 and the access right management server 16. Therefore, the user IDs of the users such as external dealers will be obtained directly from the electronic document. For the in-company online users, the policy IDs are registered for each working status (2201) as in the first embodiment.

For the users such as external dealers (including offline in-company users), the access right information is directly registered (2202). This is again for allowing offline operations on the electronic document. The cells "pointer to authentication information" 2203 contains information pointing the addresses of the authentication information (e.g., passwords) of the users such as external dealers. This authentication information is required for the DMS client 13 when the users such as external dealers attempt to operate the electronic document. For example, entry of a user ID and a password is prompted.

Figure 23:
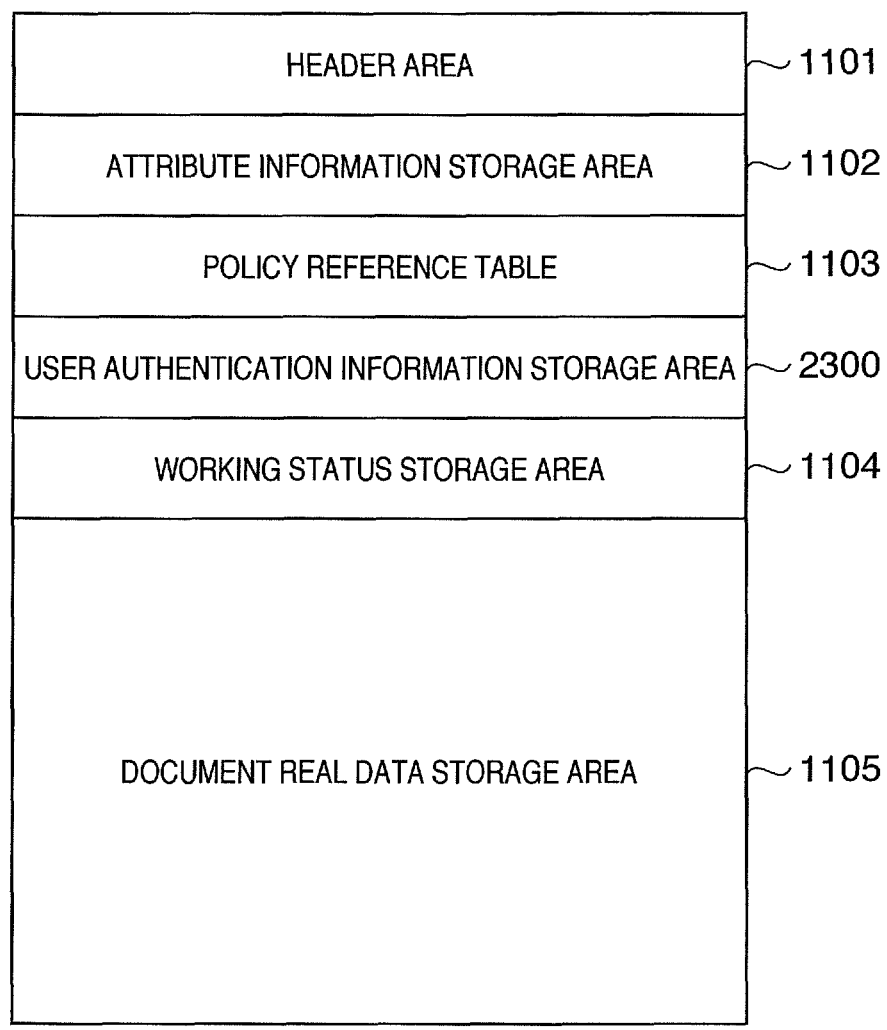
FIG. 23 is a diagram showing an example of the structure of the electronic document according to the embodiment.

FIG. 23 is a diagram showing an example of the structure of the electronic document according to this embodiment. Compared with the first embodiment, it will be recognized that a user authentication information storage area 2300 is added. This area 2300 contains the authentication information about the users such as external dealers obtained from the user authentication server 14. The authentication information about the users such as external dealer is pointed with the pointers 2203 in the policy reference table.

In step S1801, it is determined that both of the second and third working statuses in FIG. 19 are to be processed by the users such as external dealers. Therefore, the process proceeds to step S1804.

In step S1804, the CPU 22 extracts the definition information corresponding to the working statuses from the template and registers them with the policy reference table (2202). The CPU 22 also registers the user IDs of the responsible users such as external dealers obtained from the user authentication server 14 with the user condition cells 2200. These user IDs will be compared with user IDs entered in an attempt to operate the electronic document.

In step S1805, the CPU 22 stores the authentication information about the users in the user authentication information storage area 2300. The CPU 22 further generates the pointers for pointing the location where the authentication information about the users is stored and registers the pointers with the policy reference table (2203). The process then proceeds to step S1803.

In step S1803, the CPU 22 determines whether or not the policy reference table has been completed. For example, if any working status has its policy ID or definition information unset, the process returns to step S1801. Then, the processing following the step S1801 is repeated for the next working status in the template data.

<Offline Workflow Processing>

Figure 24:
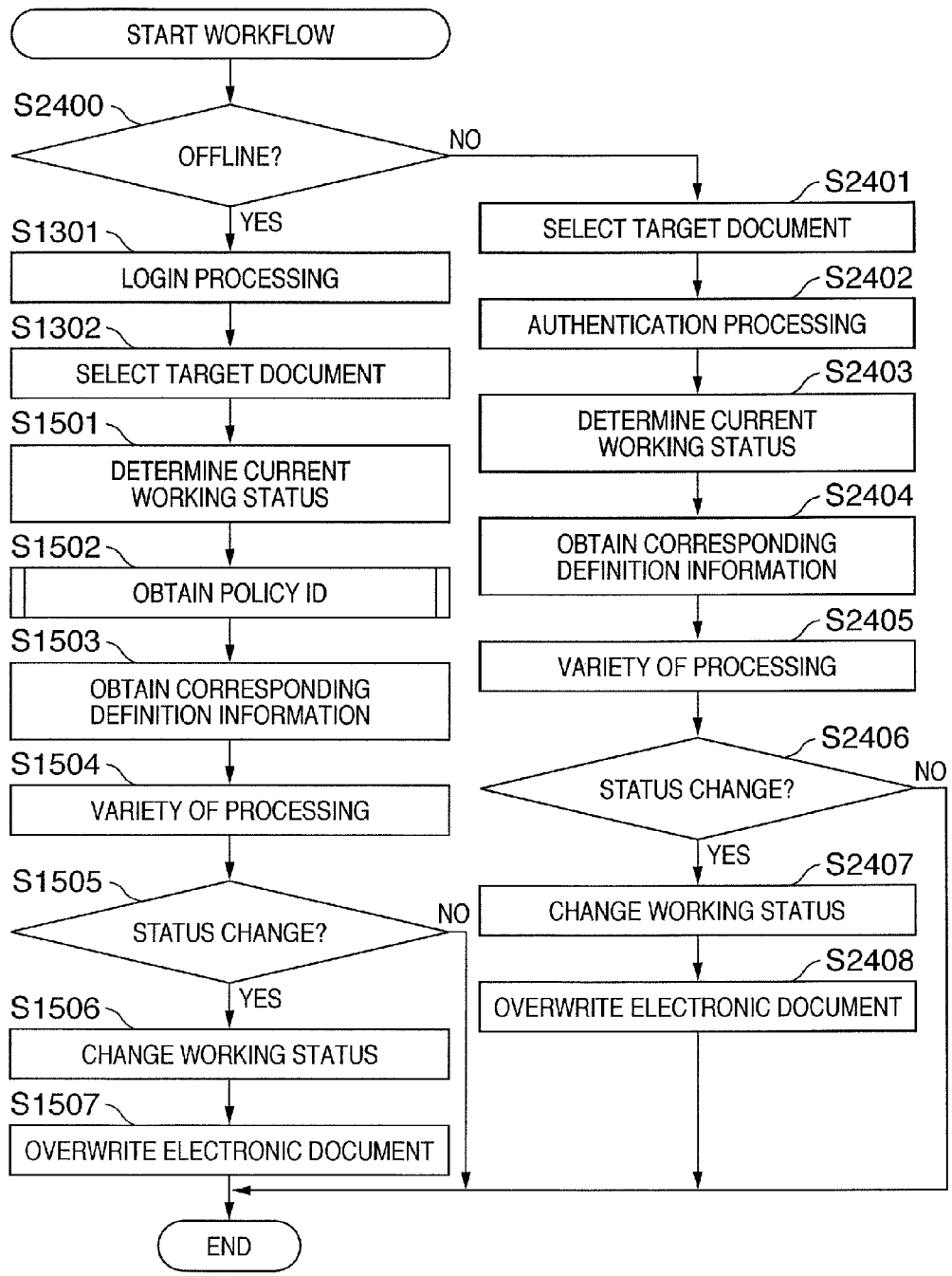
FIG. 24 is a flowchart showing an example of offline workflow processing.

FIG. 24 is a flowchart showing an example of offline workflow processing. The parts already described are given like reference numerals. The description below assumes that this flowchart is implemented in the DMS client 13 connected to another network. However, this flowchart may also be implemented by viewer software simpler than the DMS programs.

In step S2400, the CPU 22 determines whether it is in the state where connection can be made to the DMS server 12 (the online state). If it is in the online state, the above-described steps S1301 to S1507 are performed.

If it is in the offline state, the process proceeds to step S2401 and the CPU 22 performs processing for selecting a target document. In step S2402, the CPU 22 performs user authentication processing. For example, the CPU 22 displays a screen for entering a user ID and a password on the display device 27. When a user ID and a password are entered via the keyboard 25, the CPU 22 compares them with the user IDs and passwords stored in the selected electronic document. The user IDs have been registered with the policy reference table. The passwords are contained in the user authentication information storage area 2300.

If the authentication succeeds, the process proceeds to step S2403 and the CPU 22 determines the current working status. The current working status is determined based on, for example, the information stored in the working status storage area 1104.

In step S2404, the CPU 22 obtains the definition information corresponding to the determined working status. As described for FIG. 22, the access rights of the users such as external dealers are described in the policy reference table.

In step S2405, the CPU 22 controls operations on the electronic document based on the obtained definition information. That is, the CPU 22 permits the user to perform operations to the extent defined in the definition information.

In step S2406, the CPU 22 determines whether or not to change the working status of the electronic document. For example, if approval processing by Mary has been performed, the CPU 22 determines that the working status should be changed and proceeds to step S2407. If the electronic document has only been referred to, the CPU 22 determines that changing the working status is not necessary. When changing the working status is not necessary, the processing for this flowchart is terminated.

In step S2407, the CPU 22 changes the working status of the electronic document. For example, if approval by Mary has been completed, the CPU 22 changes the working status of the electronic document to "waiting for Tom's approval." More specifically, the CPU 22 writes information indicating the completion of Mary's approval to the working status storage area 1104. In step S2408, the CPU 22 saves the electronic document with the changed working status by overwriting the previous electronic document.

The CPU 22 may transmit an electronic document with the target electronic document attached thereto to the e-mail address of Tom, who will operate the target electronic document next. In that case, the user authentication data also contains the e-mail addresses of the users. The e-mail addresses of the users such as external dealers are described in the policy reference table or other locations.

As has been described, according to this embodiment, the DMS client 13 directly attaches the access right definition information corresponding to each working status to an object such as an electronic document when the electronic document is generated. In executing a workflow, the DMS client 13 determines the current working status and reads out the access right definition information corresponding to the determined current working status from the object. The DMS client 13 then controls operations on the object based on the access rights according to the obtained definition information.

Thus, because the access right definition information is contained in the electronic document, even users such as external dealers (including external dealers and offline in-company users) can participate in the workflow. A change in the working status causes the definition information to be changed as well, so that frauds such as tampering can be prevented.

The DMS client 13 also attaches to the object the authentication information about the operator who is to operate the object in each working status. For example, user IDs and passwords of users such as external dealers are stored in the electronic document. In executing the workflow, the DMS client 13 reads out the authentication information about the operator who is to operate the object in the current working status and performs authentication processing. The DMS client 13 controls operations on the object based on the access right of an operator who has succeeded in the authentication processing.

For example, an unauthenticated user is prohibited from operating the electronic document. Even if a user is successfully authenticated, the user is only allowed to perform operations according to the access right defined in the definition information. Because the authentication information is stored in the electronic document, even a PC without connection to the DMS server 12 can execute the workflow.

Furthermore, the DMS client 13 reads out the definition information from the object when connection cannot be made to the DMS server 12 that manages the object. That is, while the DMS client 13 uses the policy ID to obtain the definition information in the online state, the DMS client 13 uses the definition information in the object in the offline state. This will be convenient since the workflow can be executed even when the offline state occurs unexpectedly. In that case, the policy reference table for online mode and the policy reference table for offline mode will be stored in the object.

Other Embodiments

While different embodiments have been described above, the present invention may be applied to a system comprised of a plurality of devices or to an apparatus implemented by a single device, for example a scanner, a printer, a PC, a copier, a multifunction device, and a facsimile.

The present invention is also accomplished by directly or remotely providing a system or apparatus with a software program for implementing the functions of the above-described embodiments so that a computer included in the system reads out and executes the provided program code.

Therefore, the program code itself to be installed on the computer for implementing the functions and processing of the present invention also realizes the present invention. That is, the present invention also includes the computer program itself for implementing the functions and processing.

In that case, the program may take any form as long as it has program functionality, including object code, a program executed by an interpreter, and script data provided to an OS.

Exemplary recording media for providing the program include a flexible disk, hard disk, optical disk, magneto-optical disk, MO, CD-ROM, CD-R, and CD-RW. Exemplary recording media also include a magnetic tape, nonvolatile memory card, ROM, and DVD (DVD-ROM and DVD-R).

The program may be downloaded from a Web page on the Internet using a browser on a client computer. That is, the computer program itself of the present invention, or a compressed file of the program having an automatic installing function, may be downloaded from the Web page onto a recording medium such as a hard disk. The program may also be provided by dividing the program code constituting the program of the present invention into a plurality of files so that each file is downloaded from a different Web page. That is, the present invention also includes a WWW server that allows a plurality of users to download a program file for implementing the functions and processing of the present invention on a computer.

The program of the present invention may be stored in an encrypted form in a storage medium such as a CD-ROM and distributed to users. In that case, only users who meet certain criteria are allowed to download decryption key information from a Web page via the Internet. The users may use the key information to decrypt the encrypted program, execute the program, and install the program on their computer.

The functions of the above-described embodiments may be implemented by a computer executing the read-out program. Part or all of the actual processing may be performed under instructions of the program by an OS or the like operating on the computer. Of course, this also allows the functions of the above-described embodiments to be implemented.

The program read out from the recording medium may be written to memory provided on a function extension board inserted into a computer or in a function extension unit connected to a computer. Under instructions of the program, a CPU or the like provided on the function extension board or in the function extension unit may perform part or all of the actual processing. This may also implement the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-302164, filed Oct. 17, 2005, which is hereby incorporated by reference herein in its entirety.

What is claimed is:

1. A computer-implemented workflow system for processing an object, comprising:

a workflow management unit which manages a workflow comprising a sequence of a plurality of working statuses, wherein the object is processed by a user at each of the working statuses in the sequence included in the workflow, the working statuses including a first working status followed by a second working status according to the sequence, the first working status associated with a first user responsible for processing the object at the first working status, and the second working status associated with a second user responsible for processing the object at the second working status, the second user different than the first user, and the first working status different than the second working status;

a modifying unit which modifies information concerning an access right associated with at least a user and applied to the object when the working status for the object is changed pursuant to an advancing of the object to a next working status of the sequence of working statuses in the workflow managed by the workflow management unit, wherein the information is contained in the object, and wherein the modifying unit modifies the information to provide, at the first working status, the first user with a first access right applied to the object and the second user with a second access right applied to the object different than the first access right, and to provide, at the second working status, the first user with the second access right and the second user with the first access right; and a control unit which controls operations on the object by the first user and the second user based on the first and second access rights, respectively, when the object is being processed at the first working status, and based on the second access right and the first access right, respectively, when the object is being processed at the second working status, wherein the object contains a table with which information for identifying definition information corresponding to each working status is registered, and wherein said units are implemented, at least in part, by a computer.

2. The workflow system according to claim 1, wherein the modifying unit comprises:

a storage unit which stores definition information defining an access right in each working status for the object;

a determining unit which determines a current working status; and an obtaining unit which obtains the access right from the definition information corresponding to the determined current working status from the storage unit, wherein the control unit controls operations on the object based on the obtained access right.

3. The workflow system according to claim 2, wherein the determining unit determines the current working status by reading out information for determining the current working status contained in the object.

4. The workflow system according to claim 3, comprising:

a detecting unit which detects termination of the current working status; and an overwriting unit which, upon detection of the termination, overwrites the information for determining the current working status contained in the object with information indicating the next working status.

5. The workflow system according to claim 1, wherein the modifying unit comprises:

a determining unit which determines a current working status; and a readout unit which reads out access right definition information corresponding to the determined current working status from the object, wherein the control unit controls operations on the object based on an access right according to the read-out access right definition information.

6. The workflow system according to claim 5, further comprising an authentication unit which performs authentication processing by reading out authentication information about an operator who is to process the object in a current working status from the object, wherein the control unit controls operations on the object based on an access right of an operator who has succeeded in the authentication processing.

7. The workflow system according to claim 5, wherein the readout unit reads out the access right definition information from the object when connection cannot be made to a server which manages the object.

8. A computer-implemented workflow processing method for processing an object, comprising the steps of:

managing a workflow comprising a sequence of a plurality of working statuses, wherein the object is processed by a user at each of the working statuses in the sequence included in the workflow, the working statuses including a first working status followed by a second working status according to the sequence, the first working status associated with a first user responsible for processing the object at the first working status, and the second working status associated with a second user responsible for processing the object at the second working status, the second user different than the first user, and the first working status different than the second working status;

modifying information concerning an access right associated with at least a user and applied to the object when the working status for the object is changed pursuant to an advancing of the object to a next working status of the sequence of working statuses in the workflow managed in the managing step, wherein the information is contained in the object, and wherein the modifying step modifies the information to provide, at the first working status, the first user with a first access right applied to the object and the second user with a second access right applied to the object different than the first access right, and to provide, at the second working status, the first user with the second access right and the second user with the first access right; and controlling operations on the object by the first user and the second user based on the first and second access rights, respectively, when the object is being processed at the first working status, and based on the second access right and the first access right, respectively, when the object is being processed at the second working status, wherein the object contains a table with which information for identifying the definition information corresponding to each working status is registered, and wherein said steps are implemented, at least in part, by a computer.

9. A non-transitory computer readable medium storing a program that when executed by a computer causes the computer to perform a workflow processing method for processing an object, the program comprising:

instructions for managing a workflow comprising a sequence of a plurality of working statuses, wherein the object is processed by a user at each of the working statuses in the sequence included in the workflow, the working statuses including a first working status followed by a second working status according to the sequence, the first working status associated with a first user responsible for processing the object at the first working status, and the second working status associated with a second user responsible for processing the object at the second working status, the second user different than the first user, and the first working status different than the second working status;

instructions for modifying information concerning an access right associated with at least a user and applied to the object when the working status for the object is changed pursuant to an advancing of the object to a next working status of the sequence of working statuses in the workflow managed by the instructions for managing, wherein the information is contained in the object, and wherein the modifying instructions are further for modifying the information to provide, at the first working status, the first user with a first access right applied to the object and the second user with a second access right applied to the object different than the first access right, and to provide, at the second working status, the first user with the second access right and the second user with the first access right; and instructions for controlling operations on the object by the first user and the second user based on the first and second access rights, respectively, when the object is being processed at the first working status, and based on the second access right and the first access right, respectively, when the object is being processed at the second working status, wherein the object contains a table with which information for identifying the definition information corresponding to each working status is registered.

* * * * *